(12) United States Patent
McCrory et al.

(10) Patent No.: US 11,161,095 B1
(45) Date of Patent: Nov. 2, 2021

(54) SYNTHESIS AND CHARACTERIZATION OF $MOO_2$ NANOPARTICLES AND THEIR ABILITY TO DECONTAMINATE WATER

(71) Applicants: Michael Scott McCrory, Coral Springs, FL (US); Manoj Kumar Ram, Palm Harbor, FL (US)

(72) Inventors: Michael Scott McCrory, Coral Springs, FL (US); Manoj Kumar Ram, Palm Harbor, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/250,560

(22) Filed: Jan. 17, 2019

Related U.S. Application Data

(60) Provisional application No. 62/618,373, filed on Jan. 17, 2018.

(51) Int. Cl.
*B01J 20/06* (2006.01)
*B01J 23/28* (2006.01)
(Continued)

(52) U.S. Cl.
CPC .............. *B01J 23/28* (2013.01); *B01J 20/06* (2013.01); *B01J 20/28007* (2013.01); *B01J 20/28016* (2013.01); *B01J 20/3085* (2013.01); *B01J 35/004* (2013.01); *B01J 35/0013* (2013.01); *B01J 37/16* (2013.01); *C01G 39/02* (2013.01); *C02F 1/281* (2013.01); *C02F 1/32* (2013.01);
(Continued)

(58) Field of Classification Search
CPC . B01J 23/28; B01J 37/16; B01J 35/004; B01J 35/0013; B01J 20/28016; B01J 20/06; B01J 20/3085; B01J 20/28007; C07F 11/005; C02F 2101/308; C02F 2305/10; C02F 1/32; C02F 1/725; C02F 1/281; C02F 2103/30; C01G 39/02; C01P 2002/84; C01P 2004/04; C01P 2004/03; C01P 2002/72; C01P 2002/82; C01P 2004/64

See application file for complete search history.

(56) References Cited

U.S. PATENT DOCUMENTS

| | | | |
|---|---|---|---|
| 2011/0250110 A1* | 10/2011 | Keiser | B03C 3/017 423/210 |
| 2013/0259808 A1* | 10/2013 | Chen | A61K 49/0093 424/9.3 |
| 2019/0071320 A1* | 3/2019 | Kim | B01J 35/0013 |

FOREIGN PATENT DOCUMENTS

| | | | | |
|---|---|---|---|---|
| CN | 103288136 A | * | 9/2013 | |
| KR | 1020100125549 A | * | 12/2010 | |
| KR | 101647001 B1 | * | 8/2016 | B01J 2/04 |

OTHER PUBLICATIONS

Hu et al. Hierarchical MoO2 Microspheres: Hydrothermal Synthesis and Photocatalytic Performance for Degradation of Rhodamine B, Chinese Journal of Inorganic Chemistry, Feb. 2014, vol. 20 No. 2, p. 398-404 (Year: 2014).*

(Continued)

Primary Examiner — Taiwo Oladapo
(74) Attorney, Agent, or Firm — Michele L. Lawson; Smith & Hopen, P.A.

(57) ABSTRACT

The disclosure provides a decontaminant comprising $MoO_2$. The disclosure also provides methods to produce a decontaminant comprising $MoO_2$ and methods for decontamination of a fluid comprising us of a decontaminant comprising $MoO_2$.

6 Claims, 14 Drawing Sheets

(51) Int. Cl.
*C02F 1/72* (2006.01)
*C01G 39/02* (2006.01)
*B01J 20/28* (2006.01)
*B01J 20/30* (2006.01)
*B01J 35/00* (2006.01)
*B01J 37/16* (2006.01)
*C07F 11/00* (2006.01)
*C02F 1/28* (2006.01)
*C02F 1/32* (2006.01)
*C02F 101/30* (2006.01)
*C02F 103/30* (2006.01)

(52) U.S. Cl.
CPC ............ C02F 1/725 (2013.01); C07F 11/005 (2013.01); *C01P 2002/72* (2013.01); *C01P 2002/82* (2013.01); *C01P 2002/84* (2013.01); *C01P 2004/03* (2013.01); *C01P 2004/04* (2013.01); *C01P 2004/64* (2013.01); *C02F 2101/308* (2013.01); *C02F 2103/30* (2013.01); *C02F 2305/10* (2013.01)

(56) References Cited

OTHER PUBLICATIONS

El-Kassas et al., "Bioremediation of the textile waste effluent by Chlorella vulgaris," The Egyptian Journal of Aquatic Research, 2014, 40(3): 301-308.

Ghaffar et al., "Unprecedented photocatalytic activity of carbon coated/MoO3 core-shell nanoheterostructurs under visible light irradiation," Physica E: Low-dimensional Systems and Nanostructures, 2016. 79: 1-7.

Hu et al., "Heirarchical MoO2 Microshperes: Hydrothermal Synthesis and Photocatalytic Performance for Degradation of Rhodamine B," Chinese J. Inorg. Chem., 2014, 30, 398-404.

Kumar et al., "Synthesis of α-MoO3 nanoplates using organic aliphatic acids and investigation of sunlight enhanced photodegradation of organic dyes," Materials Research Bulletin, 2016, 76: 147-154.

Lee et al., "MoO3 thin film synthesis by chemical vapor transport of volatile MoO3(OH)2," Journal of Ceramic Processing Research, 2010, 11(1): 52-55.

Lee et al., "Deposition of Mo Oxide and Metallic Mo Films by Chemical Vapor Transport of MoO3(OH)2," Chemical Vapor Deposition, 2009, 15(7-9): 199-203.

Lee et al., "Optical properties of molybdenum oxide thin films deposited by chemical vapor transport of MoO3(OH)2," Applied Physics A, 2009, 97(1): 237-241.

Li et al., "Crystal phase- and morphology-controlled synthesis of MoO3materials," CrystEngComm, 2017, 19(11): 1479-1485.

Ma et al., "Facile synthesize α-MoO3 nanobelts with high adsorption property," Materials Letters, 2015,157: 53-56.

Mageshwari et al., "Photocatalytic activity of hierarchical CuO microspheres synthesized by facile reflux condensation method," Powder Technology, 2015, 278: 150-156.

Mahalingam et al., "Synthesis and application of graphene-αMoO3 nanocomposite for improving visible light irradiated photocatalytic decolorization of methylene blue dye," Journal of the Taiwan Institute of Chemical Engineers, 2017, 80, 276-285.

Mahmoodi et al., "Synthesis of nanoparticle and modelling of its photocatalytic dye degradation ability from colored wastewater," Journal of Environmental Chemical Engineering, 2017, 5(4): 3684-3689.

Mahmoud et al., "Bioremediation of red azo dye from aqueous solutions by Aspergillus niger strain isolated from textile wastewater," Journal of Environmental Chemical Engineering, 2017, 5(1): 547-554.

Szkoda et al., "Photocatalytical properties of maze-like MoO3 microstructures prepared by anodization of Mo plate," Electrochimica Acta, 2017, 228: 139-145.

Yang et al., "Photocatalytic degradation of methylene blue by MoO3 modified TiO2 under visible light," Chinese Journal of Catalysis, 2014, 35(1): 140-147.

Zhang et al., "Synthesis and Photo-Catalytic Properties of $M_2O_3$ Nanosheets," Key Engineering Materials, 2014, 602-603: 42-45.

Zhou et al., "Facile synthesis of MoO2 nanoparticles as high performance supercapacitor electrodes and photocatalysts," Ceramics International, 2016, 42(2): 2198-2203.

Structure Search for Ethylene glycol. ChemSpider. Search and share chemistry Ethylene glycol, chemspider.com-Chemical-Structure. 13835235.html?rid=5f2c16bd-ed21-4745-8a5a-f8133217185d.

* cited by examiner

SYNTHESIS AND CHARACTERIZATION OF MOO₂ NANOPARTICLES AND THEIR ABILITY TO DECONTAMINATE WATER

CROSS-REFERENCE TO RELATED APPLICATIONS

This application claims the benefit of U.S. Provisional Patent Application No. 62/618,373, filed Jan. 17, 2018, which is incorporated herein by reference in its entirety.

TECHNICAL FIELD

This disclosure relates to compositions and methods for decontaminating water with at least one $MoO_2$ nanoparticle.

BACKGROUND OF THE INVENTION

The decontamination of wastewater containing pollutants, such as organic dyes, specifically from the textile industry, has become a huge research area. Worldwide, the textile industry is responsible for up to 20% of the dyes used, followed by paper printing, leather production, photography, coating, and photochemical industries. Not only are these dyes toxic, carcinogenic and mutagenic, but the presence of these dyes in water can cause a depletion of dissolved oxygen, causing even more issues. Some estimates show that 10-15% of the dye used in the textile processing industry are lost into the effluent. Therefore, there is a need for effective compositions and methods to not only decontaminate dyes from wastewater but to remove pollutants from any water source.

SUMMARY OF THE INVENTION

The present disclosure is directed to a decontaminant comprising at least one functionalized $MoO_2$ nanoparticle.

The present disclosure is also directed to a method of decontamination. The method may comprise applying the decontaminant as described herein to a fluid contaminated with a pollutant and chemically reacting the decontaminant with the pollutant to at least partially remove the pollutant from the fluid.

The present disclosure is further directed to a method of producing a decontaminant as described herein. The method may comprise mixing $MoO_3$ with a reducing agent in water to form a mixture, heating the mixture and forming the decontaminant.

Other aspects of the invention will become apparent by consideration of the detailed description and accompanying drawings.

DETAILED DESCRIPTION

Figure 1:
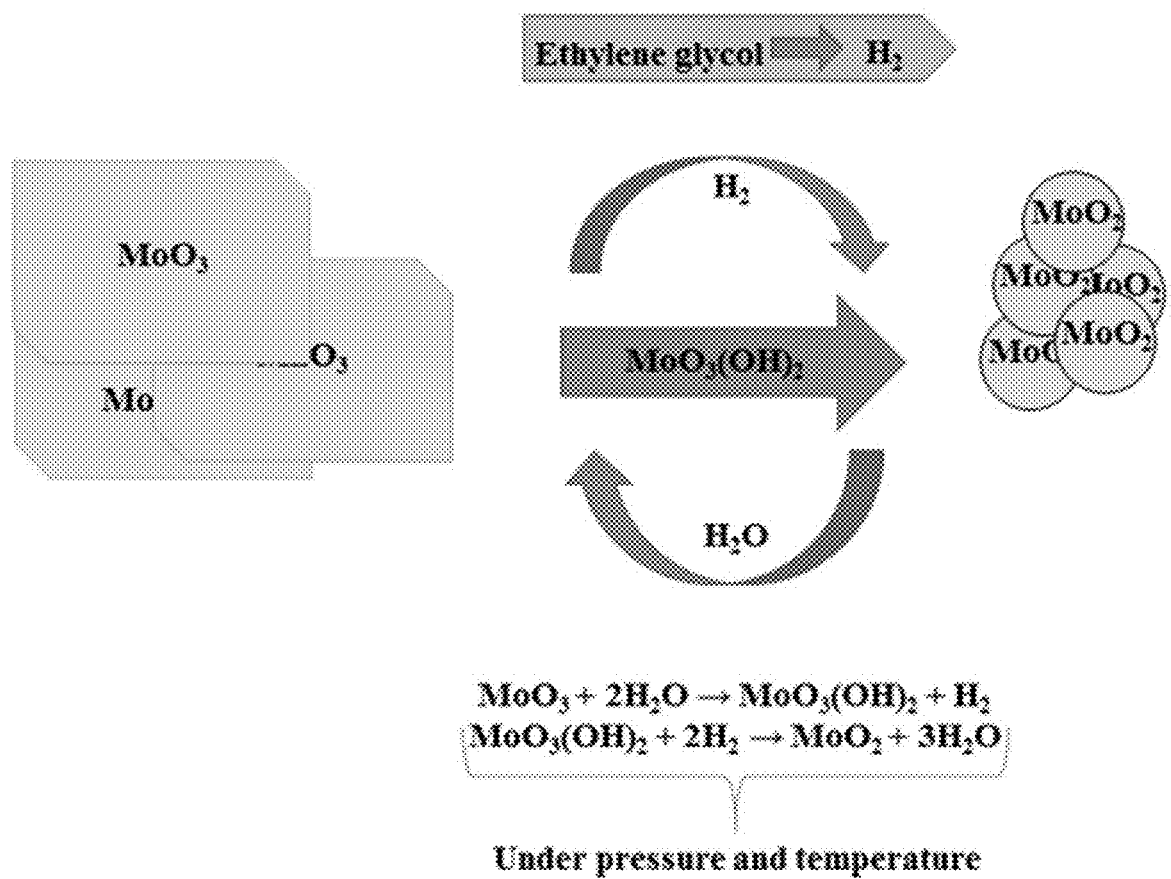
FIG. 1 is a schematic of the reduction of $MoO_3$ to $MoO_2$.

The present disclosure relates to a material newly discovered to decontaminate pollutants from water. While there have been numerous reports of the use of Molybdenum oxide ($MoO_3$) to decontaminate water, there have only been a couple reports of the use of $MoO_2$ to decontaminate water. As described herein, nanostructured $MoO_3$ and $MoO_2$ have been synthesized and tested for their abilities to decontaminate organic contaminants, such as methylene blue (MB), from an aqueous solution. The molybdenum oxide ($MoO_2$) described herein was able to decontaminate the water as an adsorbent and photocatalyst.

Nanostructured molybdenum trioxide ($MoO_3$) was synthesized and used as a precursor in a comparative study, along with commercial $MoO_3$, to synthesize molybdenum dioxide ($MoO_2$) nanoparticles. Scanning electron microscope (SEM) images revealed the particles to be approximately 30-50 nm in diameter. X-ray diffraction (XRD) confirmed $MoO_3$ was fully reduced to $MoO_2$ in all cases. Time dependent experiments showed that within two hours no traces of $MoO_3$ are present. All of the experiments showed the materials were excellent adsorbent materials, as well as photocatalysts. Both $MoO_2$ materials performed almost exactly the same, with both samples being able to remove 100% of the methylene blue (MB) in one minute with light, and in two minutes without light. It is the first reported case of a single material having both adsorbent and photocatalytic properties.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "about" as used herein as applied to one or more values of interest, refers to a value that is similar to a stated reference value. In certain aspects, the term "about" refers to a range of values that fall within 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

2. Molybdenum Dioxide Decontaminant

The present disclosure relates to a decontaminant comprising at least one functionalized $MoO_2$ nanoparticle. The decontaminant can be used to remove a pollutant, such as a pollutant dye, from a fluid contaminated with the pollutant. By using the decontaminant, the pollutant, such as a pollutant dye, is broken down into $CO_2$, $H_2O$, and/or other chemical byproducts. The pollutant may be broken down by a variety of mechanisms known in the art. In some embodiments, the functionalized $MoO_2$ nanoparticle forms an electron-hole pair with the pollutant and/or wherein chemically reacting the decontaminant with the pollutant produces radical intermediates. The decontaminant can be used to remove the pollutant The $MoO_2$ nanoparticle may be functionalized with an oxygen-containing ligand. In some embodiments, the $MoO_2$ nanoparticle is functionalized with ethylene glycol. In some embodiments, the $MoO_2$ nanoparticle is functionalized with water and heat. In some embodiments, the $MoO_2$ nanoparticle is functionalized with heat. In some embodiments, the $MoO_2$ nanoparticle is functionalized using hydrothermal synthesis.

The $MoO_2$ nanoparticle may be various sizes following functionalization. In some embodiments, the $MoO_2$ nanoparticle has a diameter less than or equal to about 50 nm. The $MoO_2$ nanoparticle may have a diameter less than or equal to about 40 nm, less than or equal to about 30 nm, less than or equal to about 20 nm or less than or equal to about 10 nm. The diameter of the $MoO_2$ nanoparticle may be between about 10 nm and about 50 nm, about 20 nm and about 50 nm, about 30 nm and about 50 nm, about 40 nm and about 50 nm, about 10 nm and about 40 nm, about 20 nm and about 50 nm, about 30 nm and about 50 nm, about 10 nm and about 30 nm, about 20 nm and about 30 nm, or about 30 nm and about 40 nm. In exemplary embodiments, the diameter of the $MoO_2$ nanoparticle is between about 30 nm and about 50 nm. In some embodiments, the diameter is about 5 nm, about 10 nm, about 15 nm, about 20 nm, about 25 nm, about 30 nm, about 35 nm, about 40 nm, about 35 nm, and about 50 nm.

The $MoO_2$ nanoparticle may take various shapes and forms following functionalization. In some embodiments, the $MoO_2$ nanoparticle comprises monoclinic $MoO_2$.

In some embodiments, the decontaminant does not comprise $MoO_3$.

In some embodiments, the decontaminant may be used to remove a pollutant from a fluid. The pollutant may be any chemical compound contaminating a fluid. In some embodiments, pollutant is a dye, an organic molecule, a chemical warfare agent, or combinations thereof.

In certain embodiments, the pollutant is a dye. The dye may be an acid dye, including, for example, anthraquinone type, azo dye type, triphenylmethane type. The dye may be a basic dye, including, for example, methylene blue dyes and crystal violet dyes, among others. The dye may be a substantive dye, including, for example, trypan blue and direct blue. The dye may be a disperse dye, including, for example, disperse yellow 26, disperse red 1, or disperse orange 37. The dye may be a sulfur dye, including, for example, sulfur black 1. The dye may be a vat dye, including, for example, vat red 10, vat violet 13 and vat orange 1. The dye may be a reactive dye, including, for example, 1.1 bi- and polyfunctional reactive dyes. The dye may be an azo dye, including, for example, methyl red, methyl orange, and Congo red. The dye may be an aniline dye, including, for example, Perkin's mauve or aniline violet, fuchsin, methyl green, aniline blue and magenta or aniline red. The dye may be a pigment dye, a mordant dye, such as mordant red 19, a naphthol dye, a phthalocyanine dye, a xanthene dye, or a pyronin dye. The dye may be an anthraquinone dye or a dye derived from anthraquinone. The dye may be a rhodamine dye or a derivative of rhodamine. The dye may be a fluorine dye or a fluorine based dye. In some embodiments, the pollutant comprises one or more dyes. In exemplary embodiments, the pollutant is methylene blue (MB).

In certain embodiments, the pollutant is an organic molecule. All types of organic compounds can be remediated and cleaned from the present invention. The organic molecule may be volatile or non-volatile. The organic compound may be an aliphatic organic compound such as, for example, alkanes, alkenes, alkynes, chloroform, ketones, aldehydes, organic alcohols, organic and substituted organic acids (carboxylic acids, chloro-trichloroacetic acid), polyaromatics, and ethers. The organic compounds may be a phenol-based compound, including, for example, 4-chlorophenol and pentachlorophenol, or any compound derived from benzene, including, for example, chlorobenzene and 4-chlorotoluene. In some embodiments, the pollutant comprises one or more organic molecules.

In certain embodiments, the pollutant is a chemical warfare agent. The chemical warfare agent may be a harassing agent, an incapacitating agent, or a lethal agent. The lethal agent may be a nerve agent, including, for example, sarin, cyclohexylsarin, soman, tabun, and VX. The lethal agent may be a choking agent, including, for example chlorine, phosgene, and diphosgene. The lethal agent may be a blistering agent, such as vesicants, sulfur mustards, arsenicals or urticants.

In some embodiments, the $MoO_2$ nanoparticle exhibits adsorbent properties. In some embodiments, the $MoO_2$ nanoparticle exhibits photocatalytic properties. In some embodiments, the $MoO_2$ nanoparticle simultaneously exhibits adsorbent and photocatalytic properties.

In some embodiments, the decontaminant may function in the absence of visible and/or UV light. In some embodiments, between about 0.5 mg to about 10 mg of the decontaminant is capable of removing at least 75.0% of a pollutant in an aqueous solution in less than 5 minutes in the absence of visible light and UV light. In some embodiments, between about 0.5 mg to about 10 mg, between about 1.0 mg to about 10 mg, between about 2.0 mg to about 10 mg, between about 3.0 mg to about 10 mg, between about 4.0 mg to about 10 mg, between about 5.0 mg to about 10 mg, between about 6.0 mg to about 10 mg, between about 7.0 mg to about 10 mg, between about 0.5 mg to about 5 mg, between about 1.0 mg to about 5 mg, between about 2.0 mg to about 5 mg, between about 3.0 mg to about 5 mg, or between about 4.0 mg to about 5 mg of the decontaminant is capable of removing at least 75.0%, at least 80.0%, at least 85.0%, at least 90.0%, at least 95.0%, at least 96.0%, at least 97.0%, at least 98.0%, at least 99.0%, at least 99.5%, or at least 99.9% of a pollutant in an aqueous solution in less than 5 minutes in the absence of visible light and UV light. In some embodiments, the decontaminant is capable of removing at least 75.0%, at least 80.0%, at least 85.0%, at least 90.0%, at least 95.0%, at least 96.0%, at least 97.0%, at least 98.0%, at least 99.0%, at least 99.5%, or at least 99.9% of a pollutant in less than about 5 minutes, less than about 4 minutes, less than about 3 minutes, less than about 2 minutes, less than about 1 minute, or less than about 30 seconds in the absence of visible light and UV light.

In some embodiments, between about 1 mg and 10 mg of the decontaminant is capable of removing at least 75.0% of methylene blue (MB) from 50 mL of a 10 mg/L MB aqueous solution in less than 5 minute in the absence of visible light and UV light. In some embodiments, 5 mg of the decontaminant is capable of removing at least 99.5% of methylene blue (MB) from 50 mL of a 10 mg/L MB aqueous solution in less than 1 minute in the absence of visible light and UV light. In some embodiments, 5 mg of the decontaminant is capable of removing at least 99.0%, at least 98%, at least 97%, at least 96%, at least 95%, at least 90%, at least 85%, at least 80%, or at least 75% of methylene blue (MB) from 50 mL of a 10 mg/L MB aqueous solution in less than 1 minute in the absence of visible light and UV light.

In some embodiments, the decontaminant may function in the presence of visible light. In some embodiments, between about 0.5 mg to about 10 mg of the decontaminant is capable of removing at least 75.0% of a pollutant in an aqueous solution in less than 5 minutes in the presence of visible light. In some embodiments, between about 0.5 mg to about 10 mg, between about 1.0 mg to about 10 mg, between about 2.0 mg to about 10 mg, between about 3.0 mg to about 10 mg, between about 4.0 mg to about 10 mg, between about 5.0 mg to about 10 mg, between about 6.0 mg to about 10 mg, between about 7.0 mg to about 10 mg, between about 0.5 mg to about 5 mg, between about 1.0 mg to about 5 mg, between about 2.0 mg to about 5 mg, between about 3.0 mg to about 5 mg, or between about 4.0 mg to about 5 mg of the decontaminant is capable of removing at least 75.0%, at least 80.0%, at least 85.0%, at least 90.0%, at least 95.0%, at least 96.0%, at least 97.0%, at least 98.0%, at least 99.0%, at least 99.5%, or at least 99.9% of a pollutant in an aqueous solution in less than 5 minutes in the presence of visible light. In some embodiments, the decontaminant is capable of removing at least 75.0%, at least 80.0%, at least 85.0%, at least 90.0%, at least 95.0%, at least 96.0%, at least 97.0%, at least 98.0%, at least 99.0%, at least 99.5%, or at least 99.9% of a pollutant in less than about 5 minutes, less than about 4 minutes, less than about 3 minutes, less than about 2 minutes, less than about 1 minute, or less than about 30 seconds in the presence of visible light. In some embodiments, the visible light has an intensity between about 700 $W/m^2$ and 900 $W/m^2$, between about 600 $W/m^2$ and 1000 $W/m^2$, between about 500 $W/m^2$ and 1100 $W/m^2$, between about 400 $W/m^2$ and 1200 $W/m^2$, between about 700 $W/m^2$ and 1000 $W/m^2$, between about 700 $W/m^2$ and 1100 $W/m^2$, between about 700 $W/m^2$ and 1200 $W/m^2$, between about 600 $W/m^2$ and 900 $W/m^2$, between about 500 $W/m^2$ and 900 $W/m^2$, or between about 400 $W/m^2$ and 900 $W/m^2$.

In some embodiments, between about 1 mg and 10 mg of the decontaminant is capable of removing at least 75.0% of methylene blue (MB) from 50 mL of a 10 mg/L MB aqueous solution in less than 5 minute in the presence of visible light. In some embodiments, 5 mg of the decontaminant is capable of removing at least 99.5% of methylene blue (MB) from 50 mL of a 10 mg/L MB aqueous solution in less than 1 minute in the presence of visible light. In some embodiments, 5 mg of the decontaminant is capable of removing at least 99.0%, at least 98%, at least 97%, at least 96%, at least 95%, at least 90%, at least 85%, at least 80%, or at least 75% of methylene blue (MB) from 50 mL of a 10 mg/L MB aqueous solution in less than 1 minute in the presence of visible light. In some embodiments, the visible light has an intensity between about 700 $W/m^2$ and 900 $W/m^2$, between about 600 $W/m^2$ and 1000 $W/m^2$, between about 500 $W/m^2$ and 1100 $W/m^2$, between about 400 $W/m^2$ and 1200 $W/m^2$, between about 700 $W/m^2$ and 1000 $W/m^2$, between about 700 $W/m^2$ and 1100 $W/m^2$, between about 700 $W/m^2$ and 1200 $W/m^2$, between about 600 $W/m^2$ and 900 $W/m^2$, between about 500 $W/m^2$ and 900 $W/m^2$, or between about 400 $W/m^2$ and 900 $W/m^2$.

In some embodiments, 5 mg of the decontaminant is capable of removing 100% of methylene blue (MB) from 50 mL of a 10 mg/L MB aqueous solution in less than 1 minute in the presence of visible light having an intensity of about 800 $W/m^2$. In some embodiments, 5 mg of the decontaminant is capable of removing at least 95%, at least 90%, at least 85%, at least 80%, or at least 75% of methylene blue (MB) from 50 mL of a 10 mg/L MB aqueous solution in less than 1 minute in the presence of visible light. In some embodiments, the visible light has an intensity between about 700 $W/m^2$ and 900 $W/m^2$, between about 600 $W/m^2$ and 1000 $W/m^2$, between about 500 $W/m^2$ and 1100 $W/m^2$, between about 400 $W/m^2$ and 1200 $W/m^2$, between about 700 $W/m^2$ and 1000 $W/m^2$, between about 700 $W/m^2$ and 1100 $W/m^2$, between about 700 $W/m^2$ and 1200 $W/m^2$, between about 600 $W/m^2$ and 900 $W/m^2$, between about 500 $W/m^2$ and 900 $W/m^2$, or between about 400 $W/m^2$ and 900 $W/m^2$.

3. A Method of Producing a Molybdenum Dioxide Decontaminant

The present disclosure provides a method of producing a decontaminant as described herein. The method may comprise mixing $MoO_3$ with a reducing agent in water to form a mixture, heating the mixture and forming the decontaminant.

The $MoO_3$ may be produced by any method known in the art. In some embodiments, the $MoO_3$ is produced by heating ammonium molybdate at about 350° C.

In some embodiments, the reducing agent comprises an oxygen-containing ligand. In some embodiments, the reducing agent is ethylene glycol.

The mixture may be heated under any condition necessary based on the starting source for the $MoO_3$ and/or the reducing agent being used. In some embodiments, the mixture is heated under a pressure greater than about 1 atm. In some embodiments, the mixture is heated under a pressure greater than about 10 atm, greater than about 20 atm, greater than about 30 atm, greater than about 40 atm, greater than about 50 atm, greater than about 60 atm, greater than about 70 atm, greater than about 80 atm, greater than about 90 atm, or greater than about 100 atm.

In some embodiments, the mixture is heated at about 180° C. In some embodiments, the mixture is heated between about 100° C. and 200° C., between about 100° C. and 250° C., between about 100° C. and 300° C., between about 100° C. and 400° C., between about 100° C. and 500° C., between about 150° C. and 250° C., between about 150° C. and 300° C., between about 150° C. and 400° C., or between about 150° C. and 500° C.

In some embodiments, the mixture is heated for less than or equal to about 12 hours. In some embodiments, the mixture is heated for less than or equal to about 10 hours, less than or equal to about 8 hours, less than or equal to about 6 hours, less than or equal to about 4 hours, or less than or equal to about 2 hours.

The method may include separating the solid particles from the mixture after the heating step. The separation can be done using any known method in the art, for example, filtration, sedimentation, or centrifugation. In some embodiments, the method further comprises applying centrifugation to the mixture after the heating step.

The method may include cleaning the mixture with an appropriate solvent after the heating step. The appropriate solvent may be an alcohol. In some embodiments, the method further comprises cleaning the mixture with ethanol and after the heating step. In some embodiments, the method further comprises cleaning the mixture with water after the heating step. In some embodiments, the method further comprises cleaning the mixture with ethanol and water after the heating step.

In some embodiments, the method further comprises drying the mixture after the heating step. The drying may be accomplished by any known method in the art, including, for example, air drying, vacuum drying, and oven drying. In exemplary embodiments, the method further comprises drying the mixture in an oven after the heating step.

4. A Method of Decontamination

The present disclosure also provides a method of decontamination using the decontaminant comprising at least one functionalized $MoO_2$ nanoparticle, as disclosed herein. The method may comprise applying the decontaminant, as described herein, to a fluid contaminated with a pollutant and chemically reacting the decontaminant with the pollutant to at least partially remove the pollutant from the fluid. In some embodiments, the fluid is water or an aqueous solution.

The pollutant may be any chemical compound contaminating a fluid. In some embodiments, pollutant is a dye, an organic molecule, a chemical warfare agent, or combinations thereof.

In certain embodiments, the pollutant is a dye. The dye may be an acid dye, including, for example, anthraquinone type, azo dye type, triphenylmethane type. The dye may be a basic dye, including, for example, methylene blue dyes and crystal violet dyes, among others. The dye may be a substantive dye, including, for example, trypan blue and direct blue. The dye may be a disperse dye, including, for example, disperse yellow 26, disperse red 1, or disperse orange 37. The dye may be a sulfur dye, including, for example, sulfur black 1. The dye may be a vat dye, including, for example, vat red 10, vat violet 13 and vat orange 1. The dye may be a reactive dye, including, for example, 1.1 bi- and polyfunctional reactive dyes. The dye may be an azo dye, including, for example, methyl red, methyl orange, and Congo red. The dye may be an aniline dye, including, for example, Perkin's mauve or aniline violet, fuchsin, methyl green, aniline blue and magenta or aniline red. The dye may be a pigment dye, a mordant dye, such as mordant red 19, a naphthol dye, a phthalocyanine dye, a xanthene dye, or a pyronin dye. The dye may be an anthraquinone dye or a dye derived from anthraquinone. The dye may be a rhodamine dye or a derivative of rhodamine. The dye may be a fluorine dye or a fluorine based dye. In some embodiments, the pollutant comprises one or more dyes. In exemplary embodiments, the pollutant is methylene blue (MB).

In certain embodiments, the pollutant is an organic molecule. All types of organic compounds can be remediated and cleaned from the present invention. The organic molecule may be volatile or non-volatile. The organic compound may be an aliphatic organic compound such as, for example, alkanes, alkenes, alkynes, chloroform, ketones, aldehydes, organic alcohols, organic and substituted organic acids (carboxylic acids, chloro-trichloroacetic acid), polyaromatics, and ethers. The organic compounds may be a phenol-based compound, including, for example, 4-chlorophenol and pentachlorophenol, or any compound derived from benzene, including, for example, chlorobenzene and 4-chlorotoluene. In some embodiments, the pollutant comprises one or more organic molecules.

In certain embodiments, the pollutant is a chemical warfare agent. The chemical warfare agent may be a harassing agent, an incapacitating agent, or a lethal agent. The lethal agent may be a nerve agent, including, for example, sarin, cyclohexylsarin, soman, tabun, and VX. The lethal agent may be a choking agent, including, for example chlorine, phosgene, and diphosgene. The lethal agent may be a blistering agent, such as vesicants, sulfur mustards, arsenicals or urticants.

In some embodiments, the method further comprises applying visible or UV light. In some embodiments, the visible or UV light may be applied with an intensity equal to or greater than about 800 $W/m^2$. In some embodiments, the visible light has an intensity between about 700 $W/m^2$ and 900 $W/m^2$, between about 600 $W/m^2$ and 1000 $W/m^2$, between about 500 $W/m^2$ and 1100 $W/m^2$, between about 400 $W/m^2$ and 1200 $W/m^2$, between about 700 $W/m^2$ and 1000 $W/m^2$, between about 700 $W/m^2$ and 1100 $W/m^2$, between about 700 $W/m^2$ and 1200 $W/m^2$, between about 600 $W/m^2$ and 900 $W/m^2$, between about 500 $W/m^2$ and 900 $W/m^2$, or between about 400 $W/m^2$ and 900 $W/m^2$.

In some embodiments, between about 0.5 mg to about 10 mg of the decontaminant is used to remove at least 75.0% of a pollutant in an aqueous solution in less than 5 minutes in the presence of visible light. In some embodiments, between about 0.5 mg to about 10 mg, between about 1.0 mg to about 10 mg, between about 2.0 mg to about 10 mg, between about 3.0 mg to about 10 mg, between about 4.0 mg to about 10 mg, between about 5.0 mg to about 10 mg, between about 6.0 mg to about 10 mg, between about 7.0 mg to about 10 mg, between about 0.5 mg to about 5 mg, between about 1.0 mg to about 5 mg, between about 2.0 mg to about 5 mg, between about 3.0 mg to about 5 mg, or between about 4.0 mg to about 5 mg of the decontaminant is used to remove at least 75.0%, at least 80.0%, at least 85.0%, at least 90.0%, at least 95.0%, at least 96.0%, at least 97.0%, at least 98.0%, at least 99.0%, at least 99.5%, or at least 99.9% of a pollutant in an aqueous solution in less than 5 minutes in the presence of visible light. In some embodiments, the decontaminant is used to remove at least 75.0%, at least 80.0%, at least 85.0%, at least 90.0%, at least 95.0%, at least 96.0%, at least 97.0%, at least 98.0%, at least 99.0%, at least 99.5%, or at least 99.9% of a pollutant in less than about 5 minutes, less than about 4 minutes, less than about 3 minutes, less than about 2 minutes, less than about 1 minute, or less than about 30 seconds in the presence of visible light. In some embodiments, the visible light has an intensity between about 700 W/m$^2$ and 900 W/m$^2$, between about 600 W/m$^2$ and 1000 W/m$^2$, between about 500 W/m$^2$ and 1100 W/m$^2$, between about 400 W/m$^2$ and 1200 W/m$^2$, between about 700 W/m$^2$ and 1000 W/m$^2$, between about 700 W/m$^2$ and 1100 W/m$^2$, between about 700 W/m$^2$ and 1200 W/m$^2$, between about 600 W/m$^2$ and 900 W/m$^2$, between about 500 W/m$^2$ and 900 W/m$^2$, or between about 400 W/m$^2$ and 900 W/m$^2$.

In some embodiments, between about 1 mg and 10 mg of the decontaminant is used to remove at least 75.0% of methylene blue (MB) from 50 mL of a 10 mg/L MB aqueous solution in less than 5 minute in the presence of visible light. In some embodiments, 5 mg of the decontaminant is used to remove at least 99.5% of methylene blue (MB) from 50 mL of a 10 mg/L MB aqueous solution in less than 1 minute in the presence of visible light. In some embodiments, 5 mg of the decontaminant is used to remove at least 99.0%, at least 98%, at least 97%, at least 96%, at least 95%, at least 90%, at least 85%, at least 80%, or at least 75% of methylene blue (MB) from 50 mL of a 10 mg/L MB aqueous solution in less than 1 minute in the presence of visible light. In some embodiments, the visible light has an intensity between about 700 W/m$^2$ and 900 W/m$^2$, between about 600 W/m$^2$ and 1000 W/m$^2$, between about 500 W/m$^2$ and 1100 W/m$^2$, between about 400 W/m$^2$ and 1200 W/m$^2$, between about 700 W/m$^2$ and 1000 W/m$^2$, between about 700 W/m$^2$ and 1100 W/m$^2$, between about 700 W/m$^2$ and 1200 W/m$^2$, between about 600 W/m$^2$ and 900 W/m$^2$, between about 500 W/m$^2$ and 900 W/m$^2$, or between about 400 W/m$^2$ and 900 W/m$^2$.

In some embodiments, 5 mg of the decontaminant is used to remove 100% of the dye when the concentration of dye in the fluid is about 10 mg/L, in less than 1 minute when visible light having an intensity of about 800 W/m$^2$ is present. In some embodiments, 5 mg of the decontaminant is used to remove 100% of methylene blue (MB) from 50 mL of a 10 mg/L MB aqueous solution in less than 1 minute in the presence of visible light having an intensity of about 800 W/m$^2$. In some embodiments, 5 mg of the decontaminant is used to remove at least 95%, at least 90%, at least 85%, at least 80%, or at least 75% of methylene blue (MB) from 50 mL of a 10 mg/L MB aqueous solution in less than 1 minute in the presence of visible light. In some embodiments, the visible light has an intensity between about 700 W/m$^2$ and 900 W/m$^2$, between about 600 W/m$^2$ and 1000 W/m$^2$, between about 500 W/m$^2$ and 1100 W/m$^2$, between about 400 W/m$^2$ and 1200 W/m$^2$, between about 700 W/m$^2$ and 1000 W/m$^2$, between about 700 W/m$^2$ and 1100 W/m$^2$, between about 700 W/m$^2$ and 1200 W/m$^2$, between about 600 W/m$^2$ and 900 W/m$^2$, between about 500 W/m$^2$ and 900 W/m$^2$, or between about 400 W/m$^2$ and 900 W/m$^2$.

In some embodiments, the method does not comprise providing or applying visible or UV light. In some embodiments, between about 0.5 mg to about 10 mg of the decontaminant is used to remove at least 75.0% of a pollutant in an aqueous solution in less than 5 minutes in the absence of visible light and UV light. In some embodiments, between about 0.5 mg to about 10 mg, between about 1.0 mg to about 10 mg, between about 2.0 mg to about 10 mg, between about 3.0 mg to about 10 mg, between about 4.0 mg to about 10 mg, between about 5.0 mg to about 10 mg, between about 6.0 mg to about 10 mg, between about 7.0 mg to about 10 mg, between about 0.5 mg to about 5 mg, between about 1.0 mg to about 5 mg, between about 2.0 mg to about 5 mg, between about 3.0 mg to about 5 mg, or between about 4.0 mg to about 5 mg of the decontaminant is used to remove at least 75.0%, at least 80.0%, at least 85.0%, at least 90.0%, at least 95.0%, at least 96.0%, at least 97.0%, at least 98.0%, at least 99.0%, at least 99.5%, or at least 99.9% of a pollutant in an aqueous solution in less than 5 minutes in the absence of visible light and UV light. In some embodiments, the decontaminant is used to remove at least 75.0%, at least 80.0%, at least 85.0%, at least 90.0%, at least 95.0%, at least 96.0%, at least 97.0%, at least 98.0%, at least 99.0%, at least 99.5%, or at least 99.9% of a pollutant in less than about 5 minutes, less than about 4 minutes, less than about 3 minutes, less than about 2 minutes, less than about 1 minute, or less than about 30 seconds in the absence of visible light and UV light.

In some embodiments, between about 1 mg and 10 mg of the decontaminant is used to remove at least 75.0% of methylene blue (MB) from 50 mL of a 10 mg/L MB aqueous solution in less than 5 minute in the absence of visible light and UV light. In some embodiments, 5 mg of the decontaminant is used to remove at least 99.5% of methylene blue (MB) from 50 mL of a 10 mg/L MB aqueous solution in less than 1 minute in the absence of visible light and UV light. In some embodiments, 5 mg of the decontaminant is used to remove at least 99.0%, at least 98%, at least 97%, at least 96%, at least 95%, at least 90%, at least 85%, at least 80%, or at least 75% of methylene blue (MB) from 50 mL of a 10 mg/L MB aqueous solution in less than 1 minute in the absence of visible light and UV light.

In some embodiments, 5 mg of the decontaminant is used to remove at least 99.5% of the dye when the concentration of dye in the fluid is about 10 mg/L, in less than 1 minute in the absence of visible light and UV light. In some embodiments, 5 mg of the decontaminant is used to remove at least 99.0%, at least 98%, at least 97%, at least 96%, at least 95%, at least 90%, at least 85%, at least 80%, or at least 75% of methylene blue (MB) from 50 mL of a 10 mg/L MB aqueous solution in less than 1 minute in the absence of visible light and UV light.

In some embodiments, the pollutant dye is broken down into $CO_2$, $H_2O$, and/or other chemical byproducts. The pollutant may be broken down by a variety of mechanisms known in the art. In some embodiments, the $MoO_2$ nanoparticle forms an electron-hole pair with the pollutant and/or wherein chemically reacting the decontaminant with the pollutant produces radical intermediates.

5. Examples

Example 1—Materials and Methods $MoO_3$, ammonium molybdate (AM), and ethylene glycol (EG) were purchased from Sigma Aldrich and used without any modification unless otherwise noted.

Synthesis of Nanostructured Molybdenum Trioxide (AM-$MoO_3$) Ammonium molybdate was heated in an oven at 350° C. for 12 hours to form nanostructured $MoO_3$, which was labeled AM-$MoO_3$ to distinguish it from the commercially produced $MoO_3$ from Sigma Aldrich.

Synthesis of Molybdenum Dioxide ($MoO_2$) Two sets of experiments were conducted to synthesize $MoO_2$; one set of experiments using $MoO_3$, and the other set of experiments using the nanostructured AM-$MoO_3$.

Initially 75 mg of either $MoO_3$ or AM-$MoO_3$ was continuously stirred into 7.5 mL of deionized water and 2.5 mL of ethylene glycol. The mixture was added to a Teflon lined stainless steel pressure, sealed, and heated at 180° C. for 12 hours. The resulting reaction produced a black powder that was subsequently separated via centrifugation and cleaned with ethanol and deionized water. The powder was then dried overnight in an oven at 80° C. FIG. 1 shows a schematic of the $MoO_3$ reduction to $MoO_2$ nanoparticles using ethylene glycol as the reducing agent. A summary of the various experiments conducted is shown in Table 1.

TABLE 1

| Sample | Amount of $MoO_3$ or AM-$MoO_3$ (mg) | Amount of $H_2O$ (mL) | Amount of EG (mL) | Time (hours) |
|---|---|---|---|---|
| $MoO_2$ | 75 | 7.5 | 2.5 | 12 |
| AM-$MoO_2$ | 75 | 7.5 | 2.5 | 12 |
| $MoO_2$-2h | 75 | 7.5 | 2.5 | 2 |
| $MoO_2$-4h | 75 | 7.5 | 2.5 | 4 |
| $MoO_2$-6h | 75 | 7.5 | 2.5 | 6 |
| $MoO_2$-8h | 75 | 7.5 | 2.5 | 8 |

Characterization X-ray diffraction (XRD) patterns were collected from the samples using a PANalytical X'Pert PRO diffractometer with CuKα radiation ($\lambda$=1.5406 Å). Scanning electron microscope (SEM) images were acquired with a Hitachi SU-70 ultra-high resolution SEM at various operating voltages. High resolution transmission electron microscope (HR-TEM) images were acquired with a FEI TECNAI F20 TEM at 200 kV.

Figure 2:
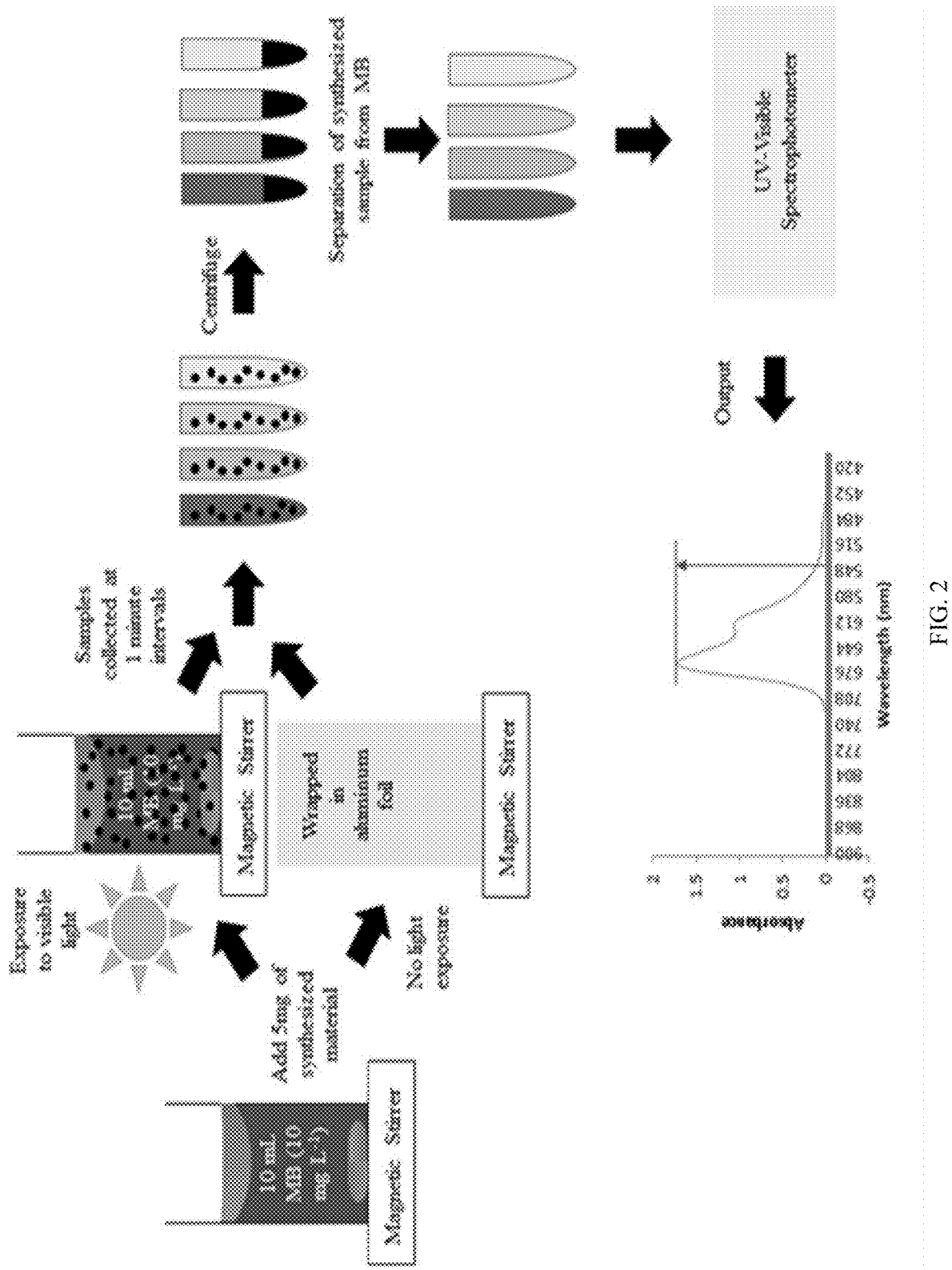
FIG. 2 is a step-by-step schematic of the typical MB degradation experiment, sample collection and analysis process.

Water Decontamination Setup The degradation of an aqueous solution of methylene blue (MB) was used to determine the ability of the samples to decontaminate organic pollutants from water with and without exposure to visible light. Visible light was provided by a 30 watt light bulb with an intensity of 800 W/m². To prepare the aqueous MB solution, 10 mg of MB was continuously stirred in to 1 L of water, yielding a concentration of 10 mg $L^{-1}$, which is a commonly used concentration for degradation experiments. In a typical decontamination experiment, 5 mg of sample material were continuously stirred in to 10 mL of MB solution. Samples were collected at 1 minute intervals for 5 minutes, and a final sample was collected at 10 minutes. The samples were immediately placed into the centrifuge upon collection to minimize any extra time the particles were exposed to the contaminant. Once the sample material had been separated from the MB solution, the MB solution was analyzed using a Jasco J-530 UV-Vis Spectrophotometer to determine the concentration of MB remaining in the solution, using the characteristic absorption peak of MB around 661 nm. A step-by-step schematic of this process is shown in FIG. 2.

Example 2—Electron Microscopy

The $MoO_2$ nanoparticles were synthesized using a single step hydrothermal synthesis technique using $MoO_3$ or nanostructured AM-$MoO_3$ as the molybdenum precursor. The $MoO_2$ nanoparticles were washed with ethanol and DI water, and then dried in an oven. $MoO_3$ reduction to $MoO_2$ nanoparticles using ethylene glycol as the reducing agent formed $MnO_2$ nanoparticles. The $MoO_2$ nanoparticles obtained from the process required no further processing once dried.

Figure 3A:
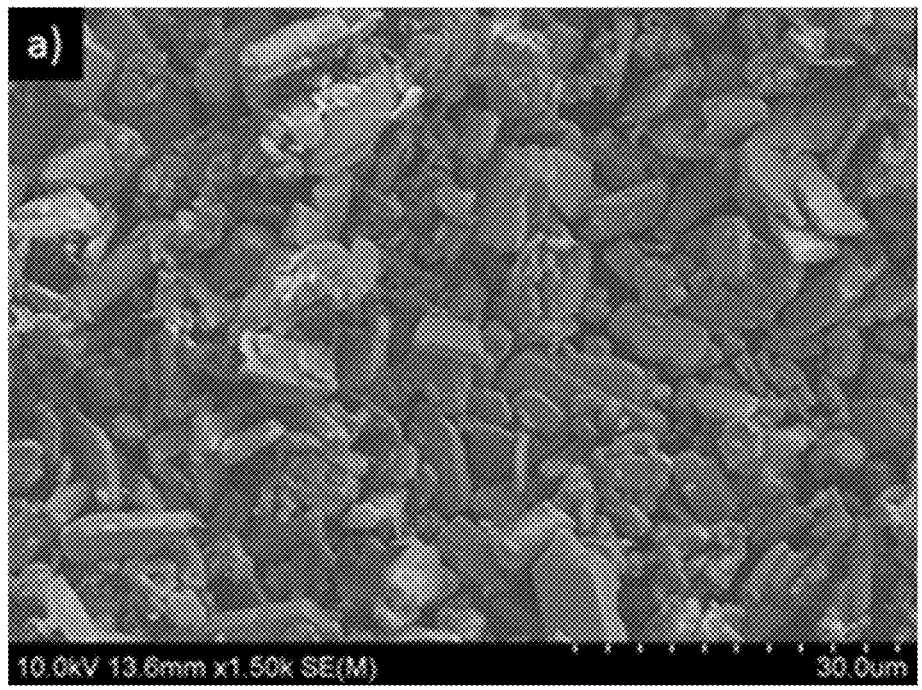
FIGS. 3A-3D are SEM images of $MoO_3$ (FIG. 3A), AM-$MoO_3$ (FIG. 3B), $MoO_2$ (FIG. 3C), and AM-$MoO_2$ (FIG. 3D).
Figure 3B:
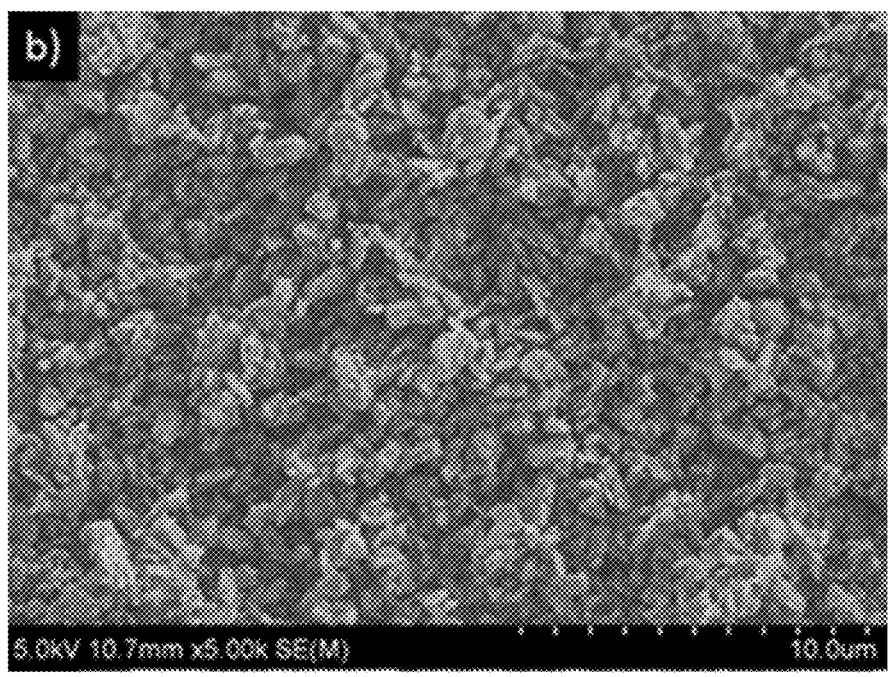
Figure 3C:
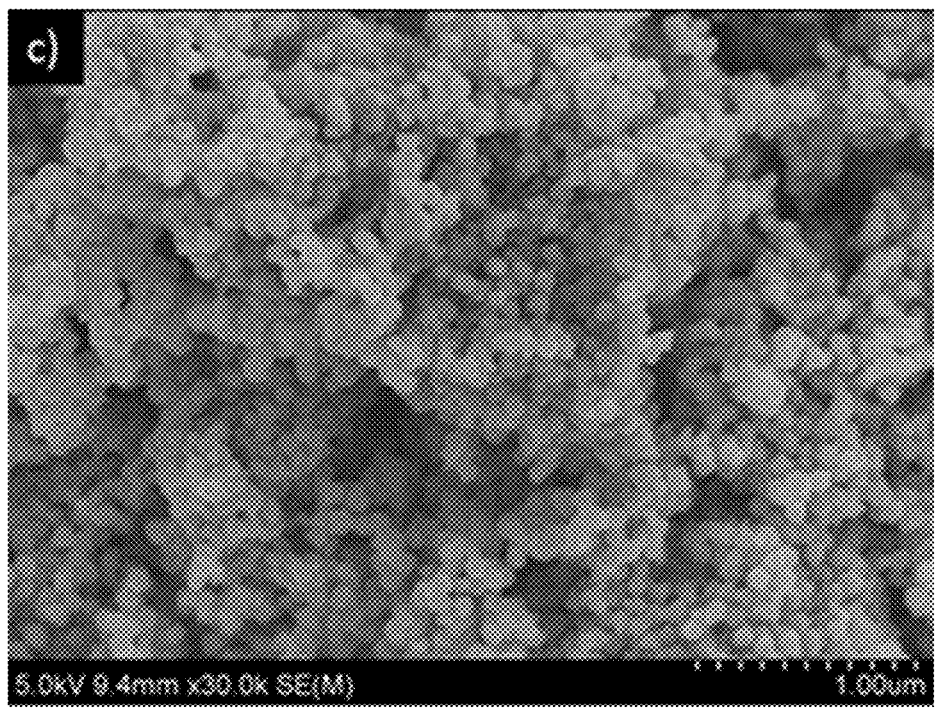
Figure 3D:
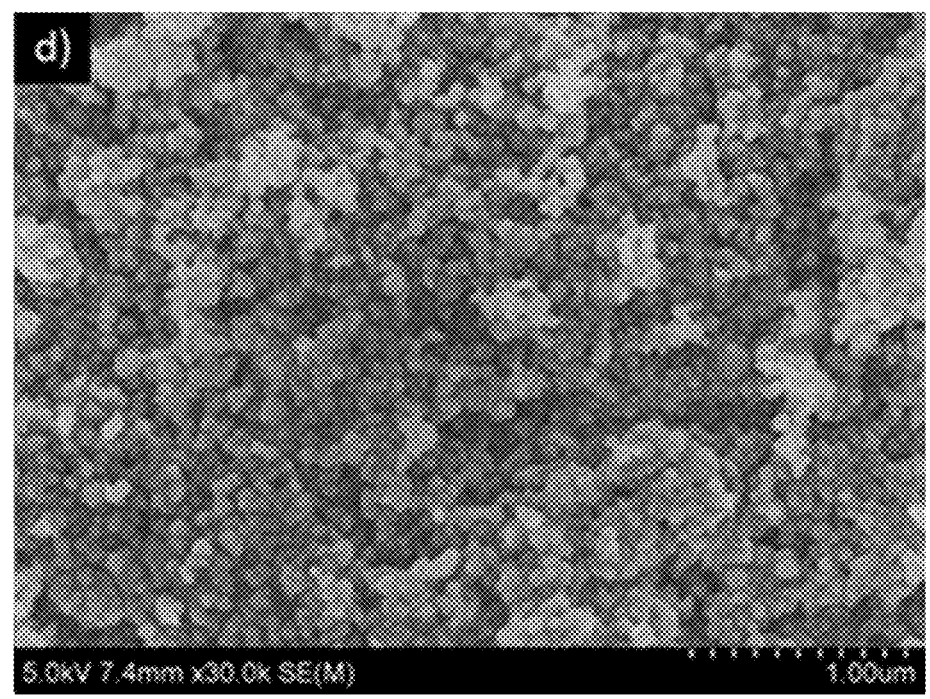

An SEM image of the commercial $MoO_3$ is shown in FIG. 3A. The image revealed that the material had a platelet like structure, with large particles up to 20 µm long. Meanwhile, an SEM image of the AM-$MoO_3$ is shown in FIG. 3B, where is the image clearly revealed that the AM-$MoO_3$ had the same platelet-like structure as the commercial $MoO_3$, except the platelets were nano-sized. The nanostructured AM-$MoO_3$ platelets were a few hundred nanometers wide, with the largest particles around 1p m long. It was also clear from the SEM images that the AM-$MoO_3$ seemed to be much more uniform in size and shape compared to the commercial $MoO_3$. FIG. 3C shows an SEM image of the hydrothermally synthesized $MoO_2$ nanoparticles. It was clear that the $MoO_2$ nanoparticles were relatively uniform in shape and size, with most particles ranging from 30 to 50 nm. FIG. 3D shows an SEM image of the AM-$MoO_2$ with nanoparticles ranging from 30 to 50 nm. It was clear that there were no longer any AM-$MoO_3$ platelets present, indicating all of the AM-$MoO_3$ had been reduced to $MoO_2$, as also confirmed by XRD.

Figure 4:
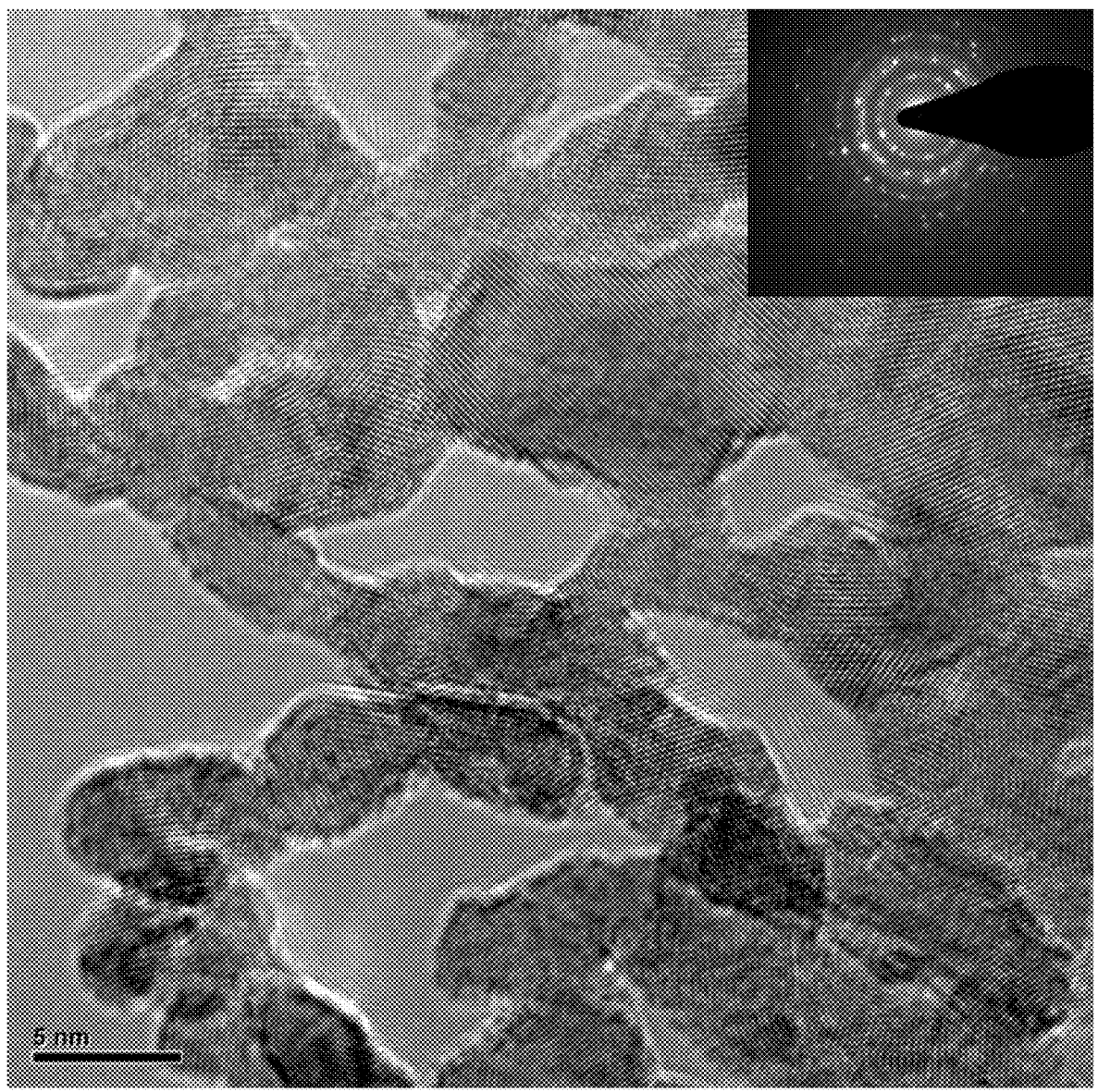
FIG. 4 is a HR-TEM image of $MoO_2$, with the selected area diffraction pattern inset.
Figure 5A:
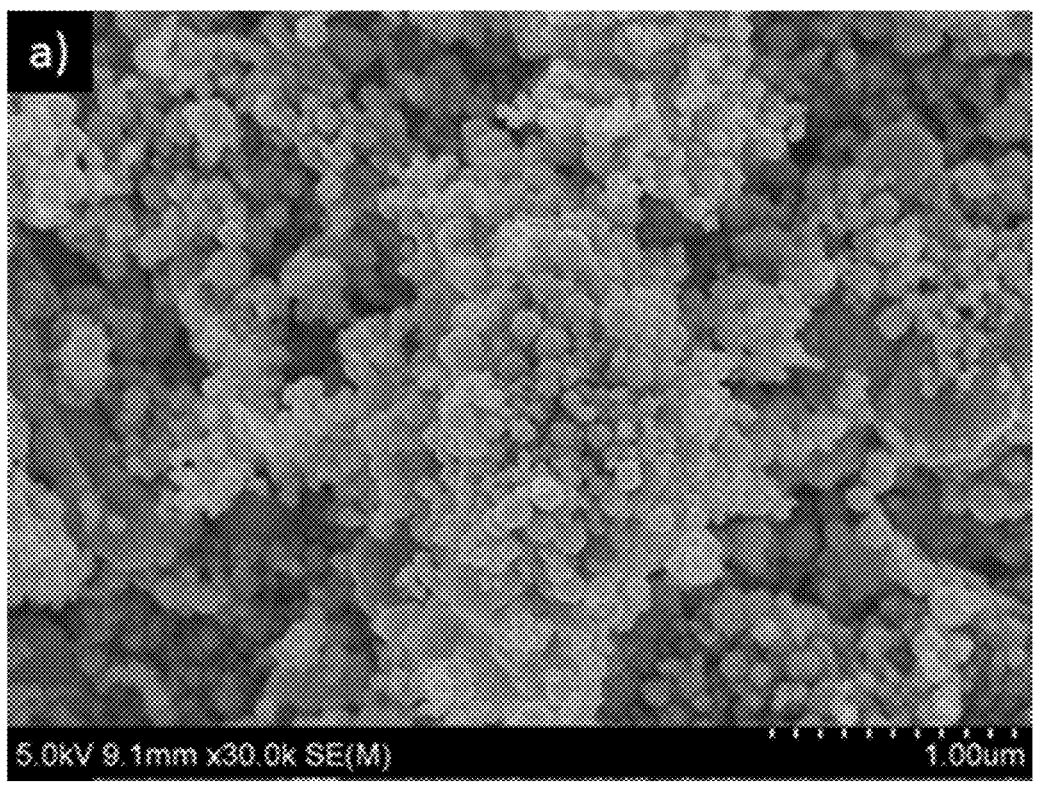
FIGS. 5A-5D are SEM images of $MoO_2$ after a reaction time of 2 hours (FIG. 5A), 4 hours (FIG. 5B), 6 hours (FIG. 5C) and 8 hours (FIG. 5D).
Figure 5B:
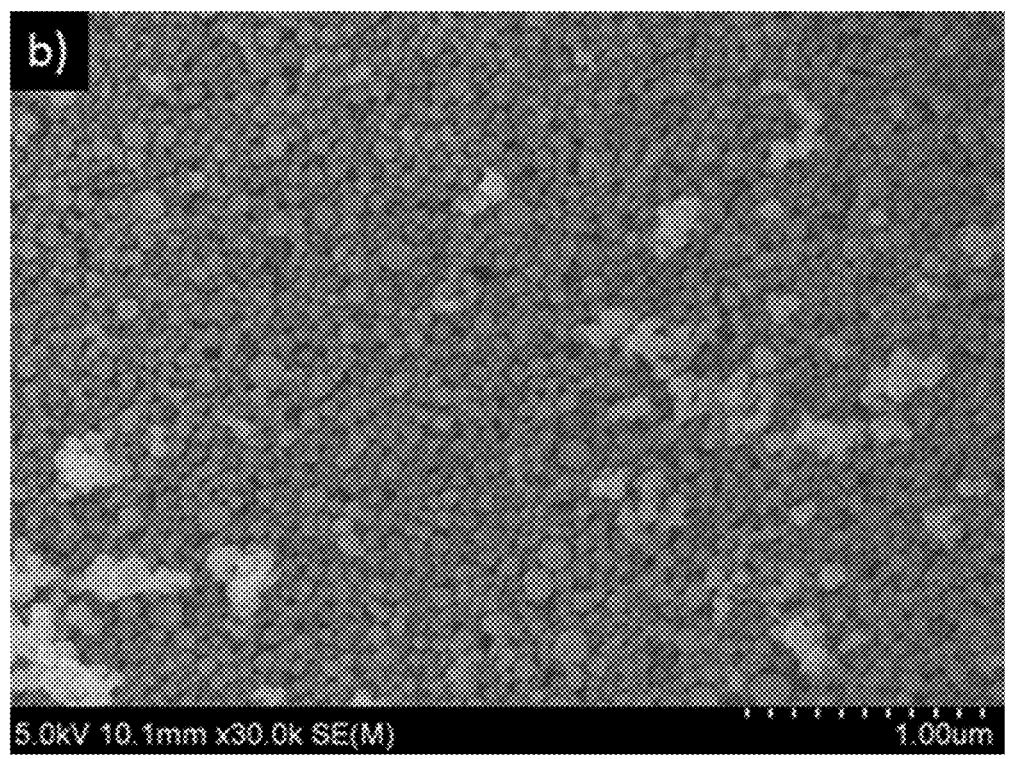
Figure 5C:
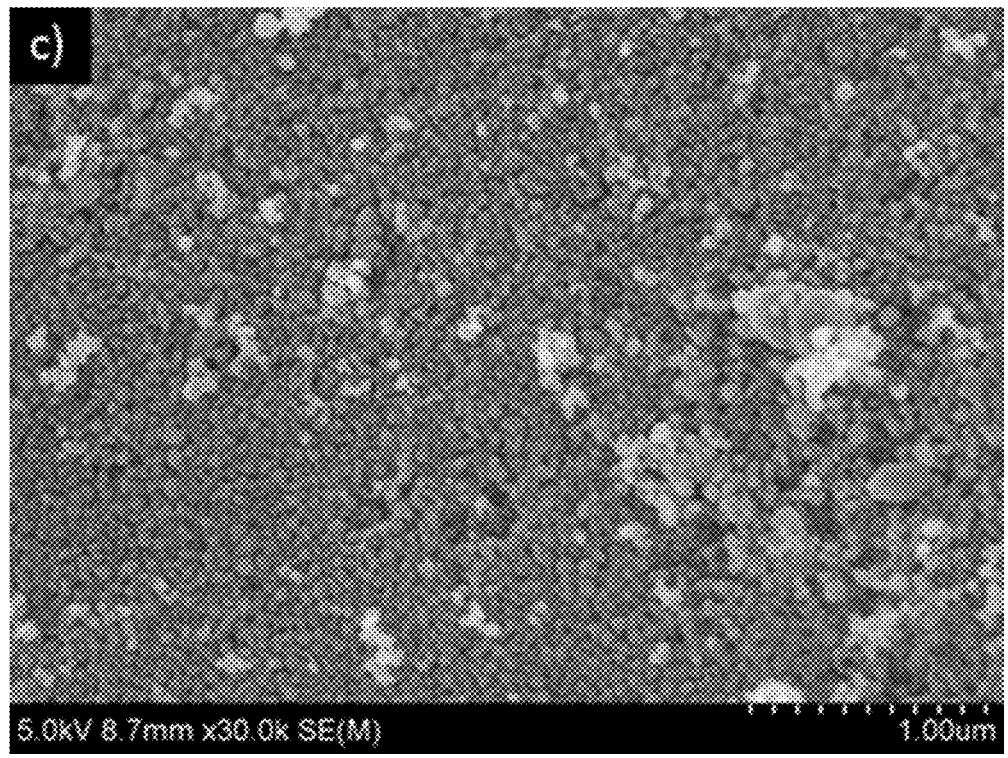
Figure 5D:
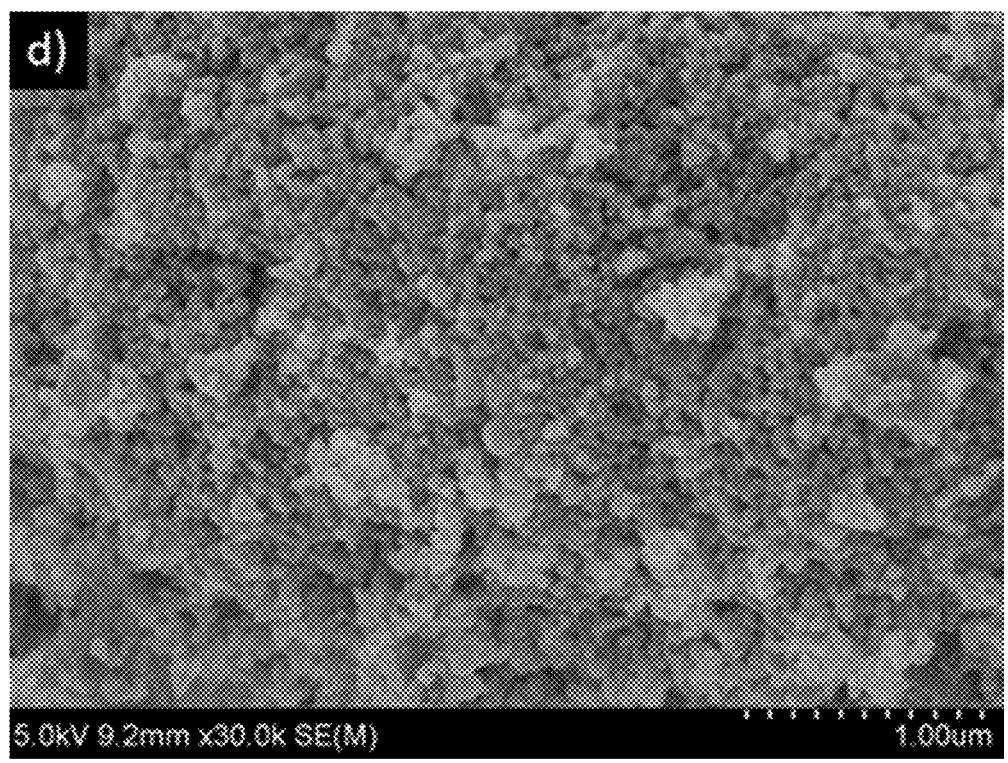

A TEM image of the hydrothermally synthesized $MoO_2$ is shown in FIG. 4. Both the TEM image and the inset diffraction pattern showed an atomic d-spacing of approximately 1.7, 2.4 and 3.4 Å, which corresponded to the (−111), (111) and (022) planes of monoclinic $MoO_2$, respectively. The d-spacing values obtained from the TEM matched the d-spacing results obtained from XRD, further confirming the formation of monoclinic $MoO_2$.

The results from the time dependent experiment are shown in FIGS. 5A-5D. The 2 hour sample shown in FIG. 5A clearly showed that the $MoO_3$ platelets had been reduced to form $MoO_2$ nanoparticles, however a few larger pieces were still present. As the reaction time progressed to 4 hours or more, it was clear that the $MoO_3$ platelets had been completely reduced, leaving only uniform $MoO_2$ nanoparticles, as confirmed by XRD.

Example 3—X-Ray Diffraction (XRD)

Figure 6:
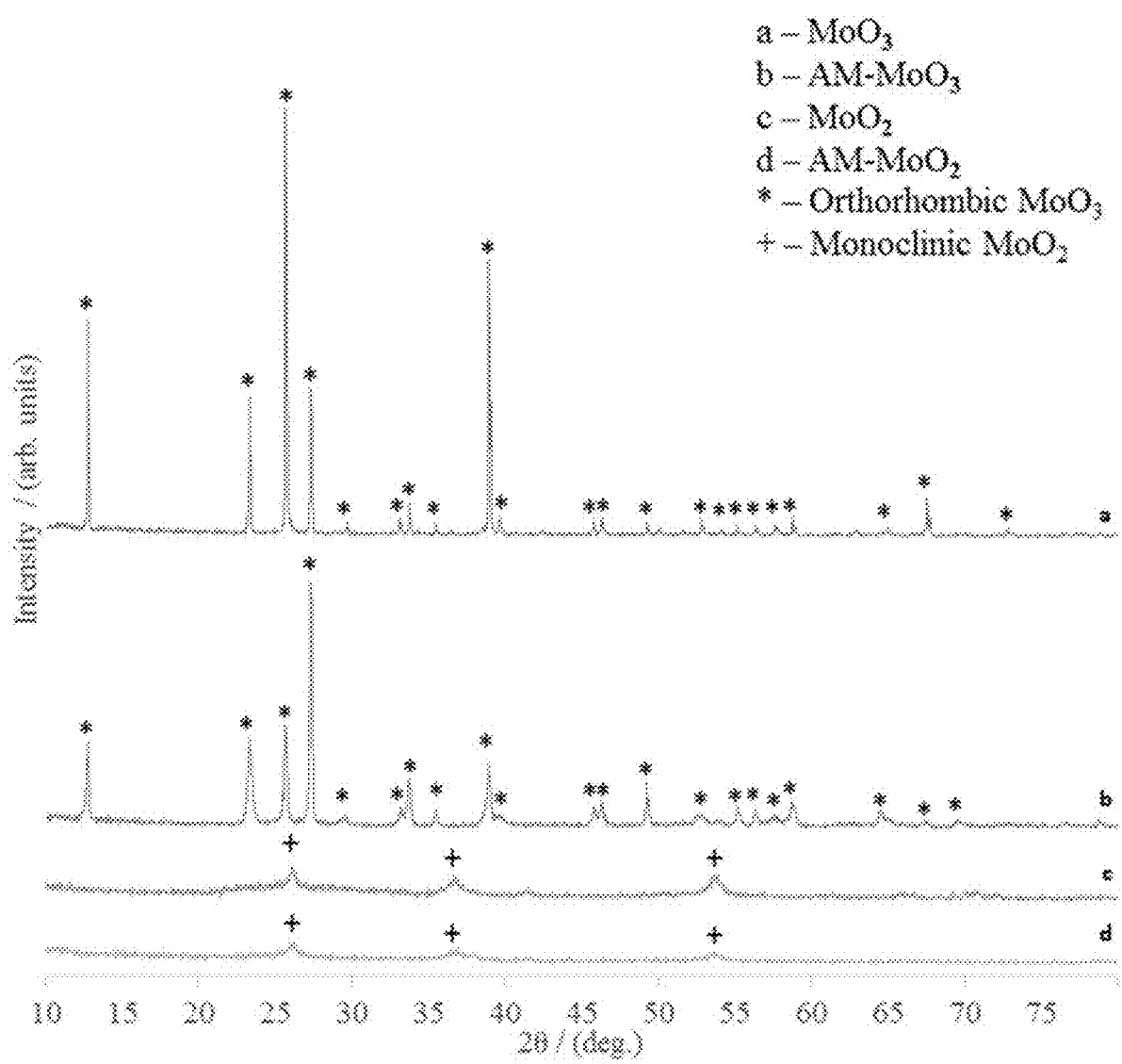
FIG. 6 graphically illustrates XRD patterns for the various samples.

XRD patterns for $MoO_3$, AM-$MoO_3$, $MoO_2$, and AM-$MoO_2$ are shown in FIG. 6. Both the $MoO_3$ and AM-$MoO_3$ powders were indexed to the orthorhombic phase of $MoO_3$; with major characteristic diffraction peaks at 12.77°, 23.33°, 25.70°, 27.32°, and 38.97°, which correspond to the (020), (110), (040), (021), and (060) planes, respectively. The diffraction peaks for AM-$MoO_3$ were less intense and slightly broader that the diffraction peaks for $MoO_3$, indicating the AM-$MoO_3$ had a smaller crystallite/particle size, as later confirmed by SEM. The diffraction patterns for both $MoO_2$ and AM-$MoO_2$ were indexed to the monoclinic phase of $MoO_2$, with major characteristic peaks at 26.11°, 36.75°, 53.69°, which correspond to the (−111), (200), and (022) planes, respectively. Again it was clear that the diffraction peaks for both $MoO_2$ and AM-$MoO_2$ had an even lower intensity and were even broader than the diffraction peaks for AM-$MoO_3$, indicating even smaller crystallite/particle size, as later confirmed by SEM.

Figure 7:
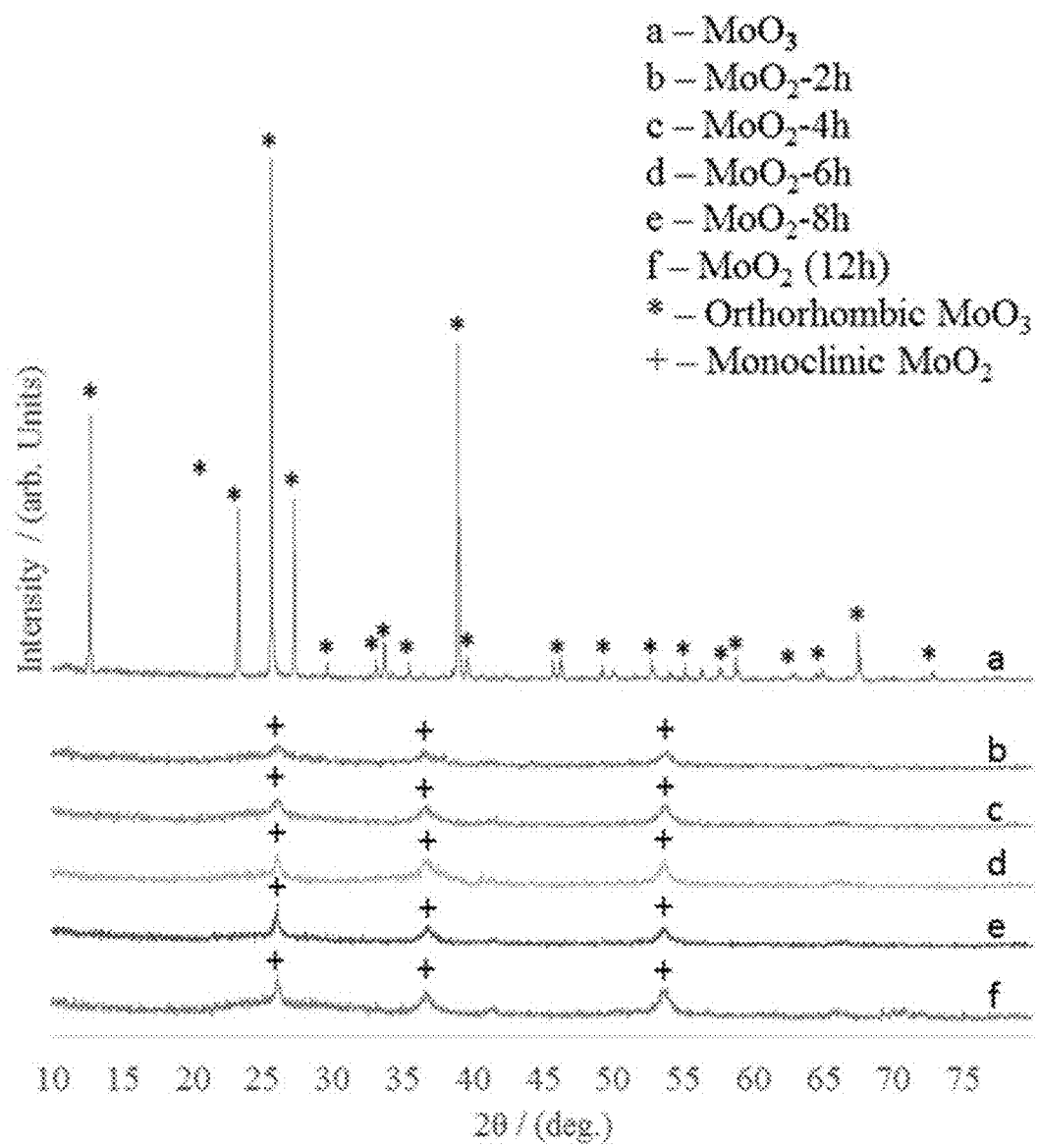
FIG. 7 graphically illustrates XRD patterns for the time dependent experiments.

XRD patterns for the time dependent experiments are shown in FIG. 7. It was clear that within 2 hours all of the $MoO_3$ had been completely reduced to $MoO_2$, as there were no longer any characteristic diffraction peaks related to $MoO_3$.

Example 4—Decontamination

To determine the ability of the samples to decontaminate organic pollutants from water, experiments were conducted to measure the degradation of MB. Until now, all previous reports of $MoO_2$ and $MoO_3$ for the decontamination of water have been photocatalytic, requiring the sample be exposed to ultraviolet (UV) or visible light radiation. In these previous decontamination experiments the sample was mixed in to the MB solution with no exposure to light, and allowed to mix for at least 30 minutes to come to an adsorption/desorption equilibrium. At that point, the samples were then exposed to either UV or visible light radiation for a determined period of time. When this same experiment was attempted with the hydrothermally synthesized $MoO_2$ and AM-$MoO_2$ detailed above, the MB had been completely decontaminated by the end of the 30 minute adsorption/desorption equilibrium. At that point, it became clear that the $MoO_2$ and AM-$MoO_2$ materials were highly adsorbent; so the experiment was modified to see how quickly the samples could adsorb the MB, and if the exposure of visible light affected the rate at which the MB was decontaminated.

Figure 8:
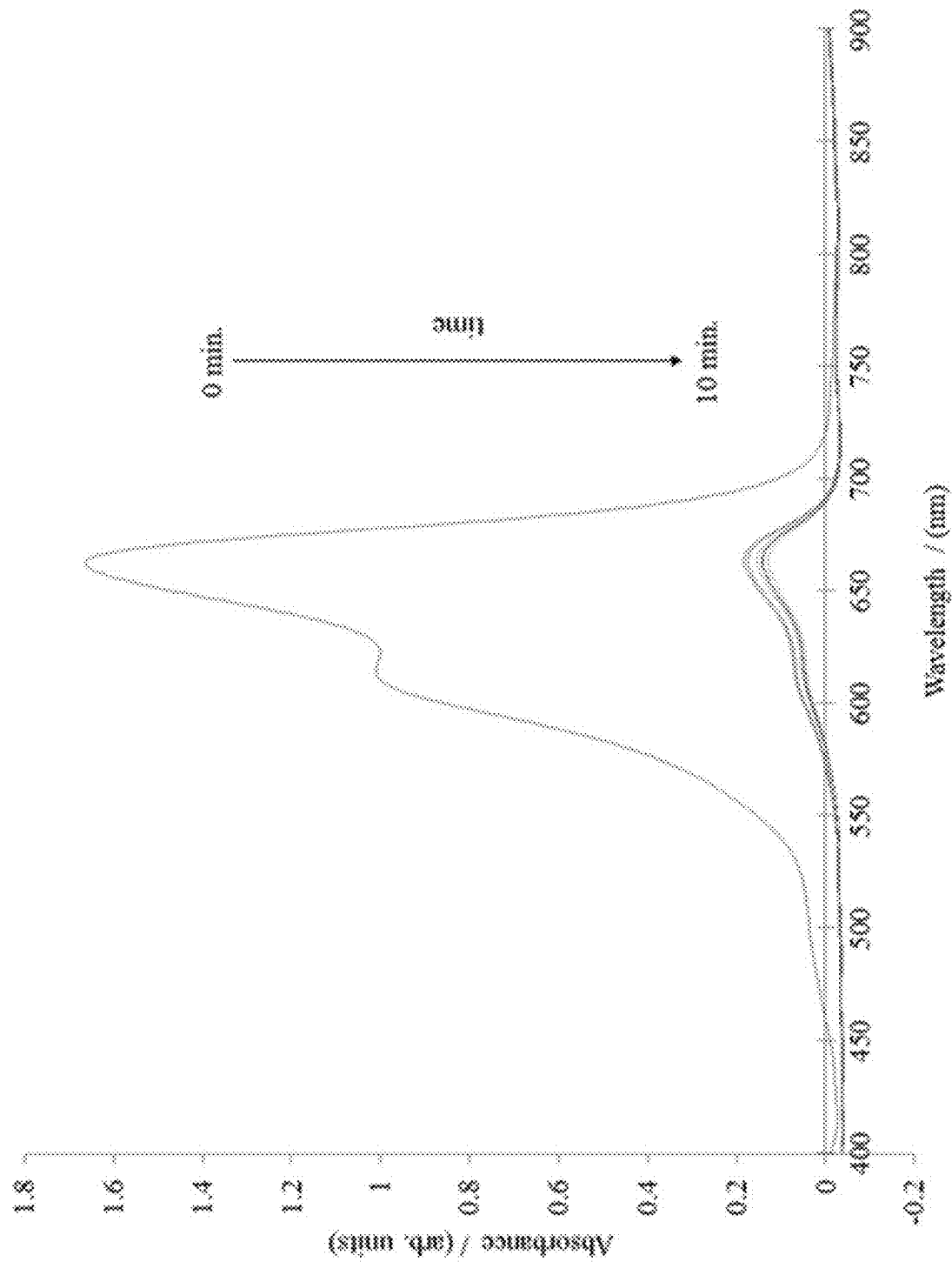
FIG. 8 graphically illustrates UV-visible absorption spectra for AM-$MoO_3$ with no light exposure.
Figure 9:
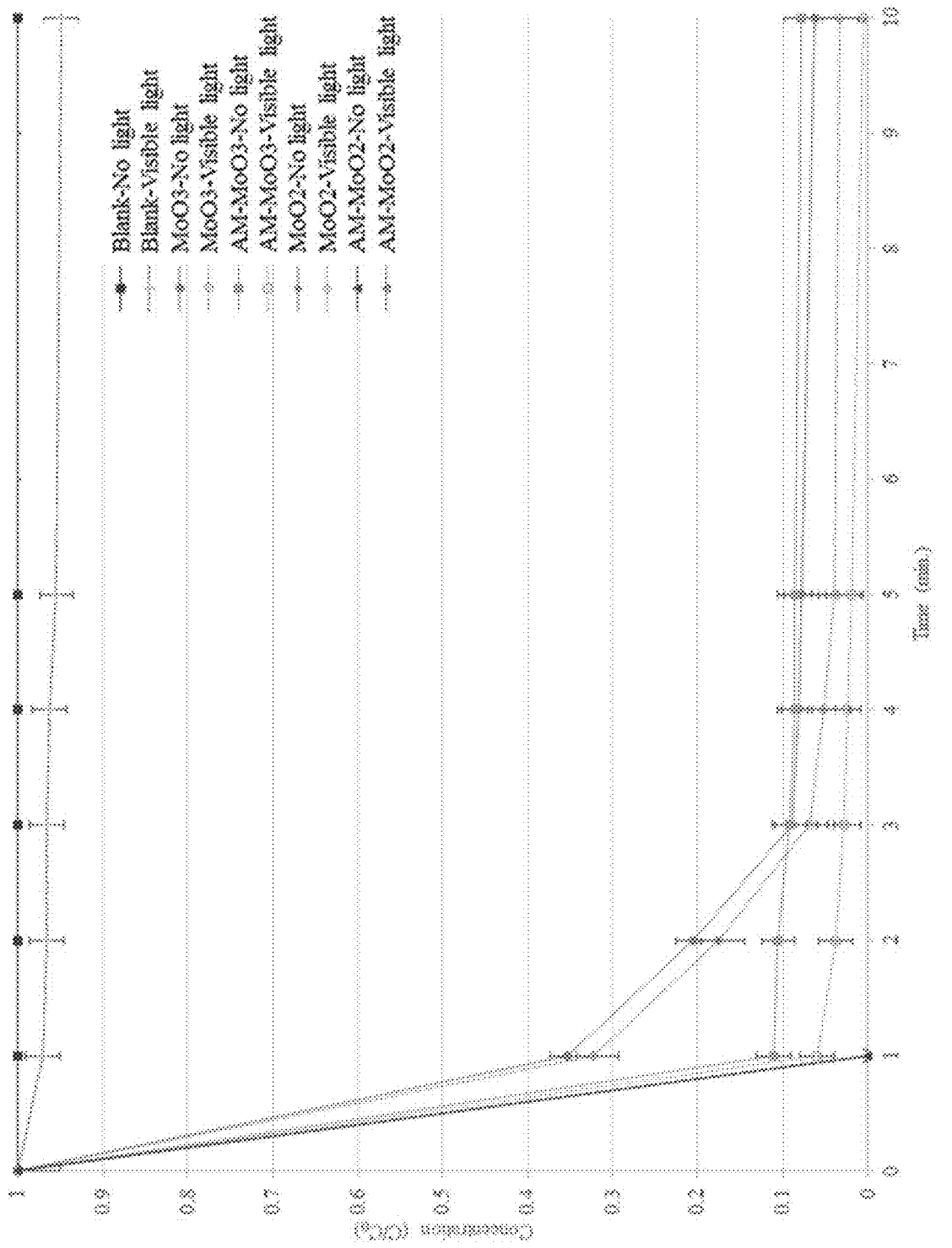
FIG. 9 graphically illustrates concentration (C/Co) vs. time (min) for the decontamination of 10 mL MB by 5 mg of sample.

For the next decontamination experiment, 2 sets of experiments were conducted; one set with exposure to visible light radiation and one set with no exposure to light. Typically, a 5 mg sample was added to 10 mL of MB (10 mg $L^{-1}$) under continuous stirring. The concentration of MB was monitored using UV-visible spectrophotometry measuring the maximum absorbance at the characteristic wavelength of MB, near 661 nm, as shown in FIG. 8. The initial concentration, Co, of MB was measured before any material was added, and then the concentration was measured from the samples collected in 1 minute intervals.

With no exposure to light, the MB was degraded less than 0.5% during the 10 minute period. If exposed to light, the MB degraded about 5% during that same 10 minute period, leaving 95% of the MB remaining. When $MoO_3$ was added to a MB solution, with no visible light exposure, over 90% of the MB was adsorbed within the first 3 minutes, and 93.7% adsorbed by the end of 10 minutes. When $MoO_3$ was added to a MB solution, with visible light exposure, over 93% of the MB was removed within the first 3 minutes, and 96.7% removed by the end of 10 minutes. When AM-$MoO_3$ was added to a MB solution, with no visible light exposure, 89% of the MB was adsorbed within the first minute, and 92.3% adsorbed by the end of 10 minutes. When AM-$MoO_3$ was added to a MB solution, with visible light exposure, over 94% of the MB was removed within the first minute, and over 99.4% removed by the end of 10 minutes. When $MoO_2$ was added to a MB solution, with or without visible light exposure, 100% of the MB was removed within 1 minute. The same thing happened when AM-$MoO_2$ was added to a MB solution; regardless of light exposure, 100% of the MB was removed within 1 minute. A summary of these results is shown in Table 2.

TABLE 2

Decontamination results for 5 mg of sample in 10 mL MB (10 mg L-1)

| Sample | Amount of MB decontaminated | Time |
|---|---|---|
| Blank - No light exposure | 0.05% | 10 min |
| Blank - Visible light exposure | 5.1% | 10 min |
| $MoO_3$ - No light exposure | 93.7% | 10 min |
| $MoO_3$ - Visible light exposure | 96.7% | 10 min |
| AM-$MoO_3$ - No light exposure | 92.3% | 10 min |
| AM-$MoO_3$ - Visible light exposure | 99.4% | 10 min |
| $MoO_2$ - No light exposure | 100% | 1 min |
| $MoO_2$ - Visible light exposure | 100% | 1 min |

TABLE 2-continued

Decontamination results for 5 mg of sample in 10 mL MB (10 mg L-1)

| Sample | Amount of MB decontaminated | Time |
|---|---|---|
| AM-$MoO_2$ - No light exposure | 99.95 | 1 min |
| AM-$MoO_2$ - Visible light exposure | 100% | 1 min |

Figure 10:
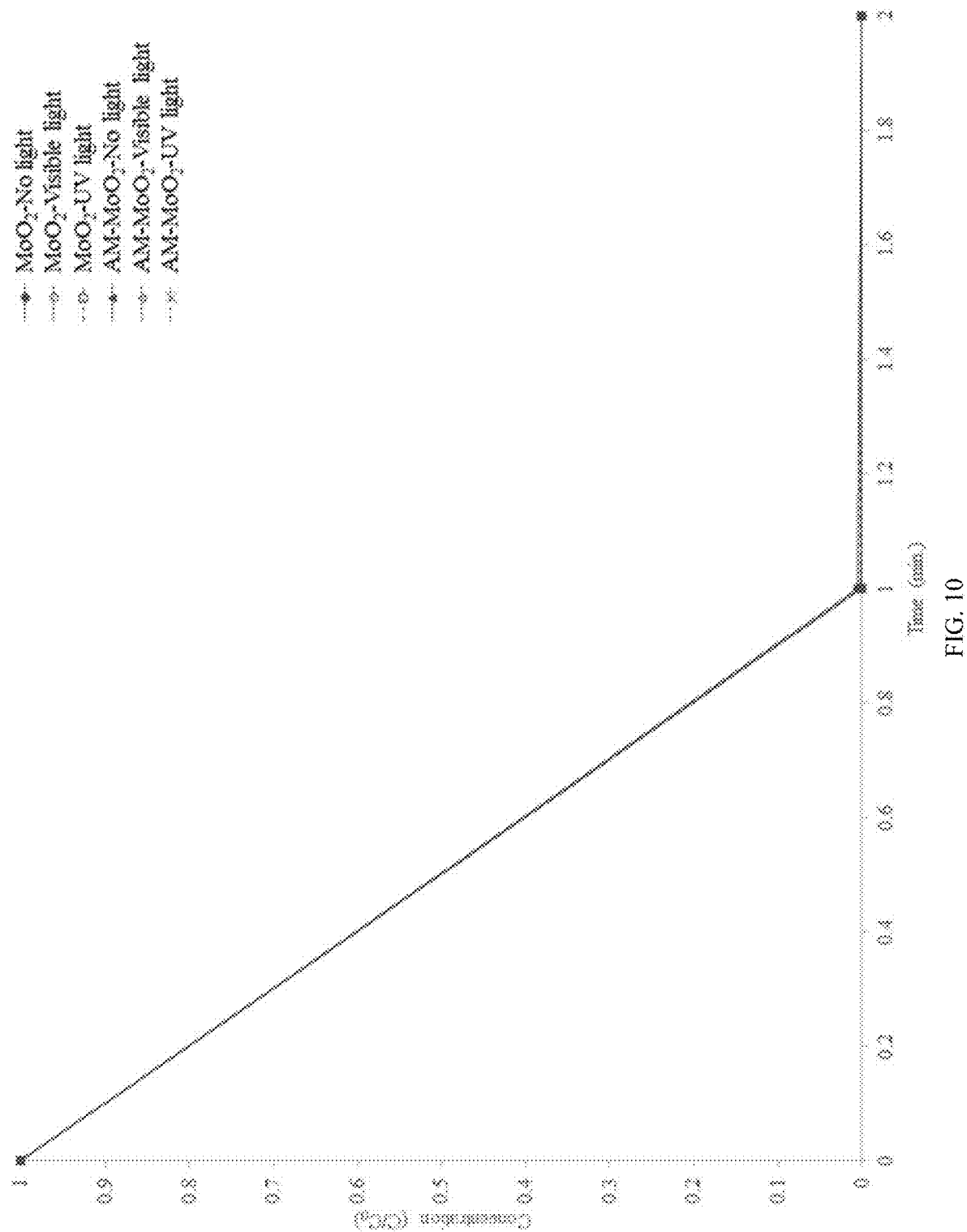
FIG. 10 graphically illustrates concentration (C/Co) vs. time (min) for the decontamination of 50 mL MB by 5 mg of sample.

Since both the $MoO_2$ and AM-$MoO_2$ performed the exact same for the previous experiment, the experiment was modified again to test 5 mg of sample in 50 mL of MB with exposure to: visible light radiation, UV light radiation, and no light exposure. It was clear from the data shown in FIG. 10 that both the $MoO_2$ and AM-$MoO_2$ performed incredibly well, and that the $MoO_2$ was able to adsorb 99.6% of the MB within one minute, and 100% within two minutes, with no exposure to visible light. When the $MoO_2$ was exposed to visible light, it was able to remove 100% of the MB within the first minute. The AM-$MoO_2$ was able to adsorb 99.95% of the MB within one minute, and 100% within two minutes, with no exposure to visible light. When the AM-$MoO_2$ was exposed to visible light, it was able to remove 100% of the MB within the first minute. A summary of these results is shown in Table 3.

TABLE 3

Decontamination results for 5 mg of sample in 50 mL of MB (10 mg L-1)

| Sample | Amount of MB decontaminated in 1 min | Amount of MB decontaminated in 2 min |
|---|---|---|
| $MoO_2$ - No light exposure | 99.56% | 100% |
| $MoO_2$ - Visible light exposure | 100% | N/A |
| $MoO_2$ - UV light exposure | 99.82 | 100% |
| AM-$MoO_2$ - No light exposure | 99.95% | 100% |
| AM-$MoO_2$ - Visible light exposure | 100% | N/A |
| AM-$MoO_2$ - UV light exposure | 100% | N/A |

Figure 11:
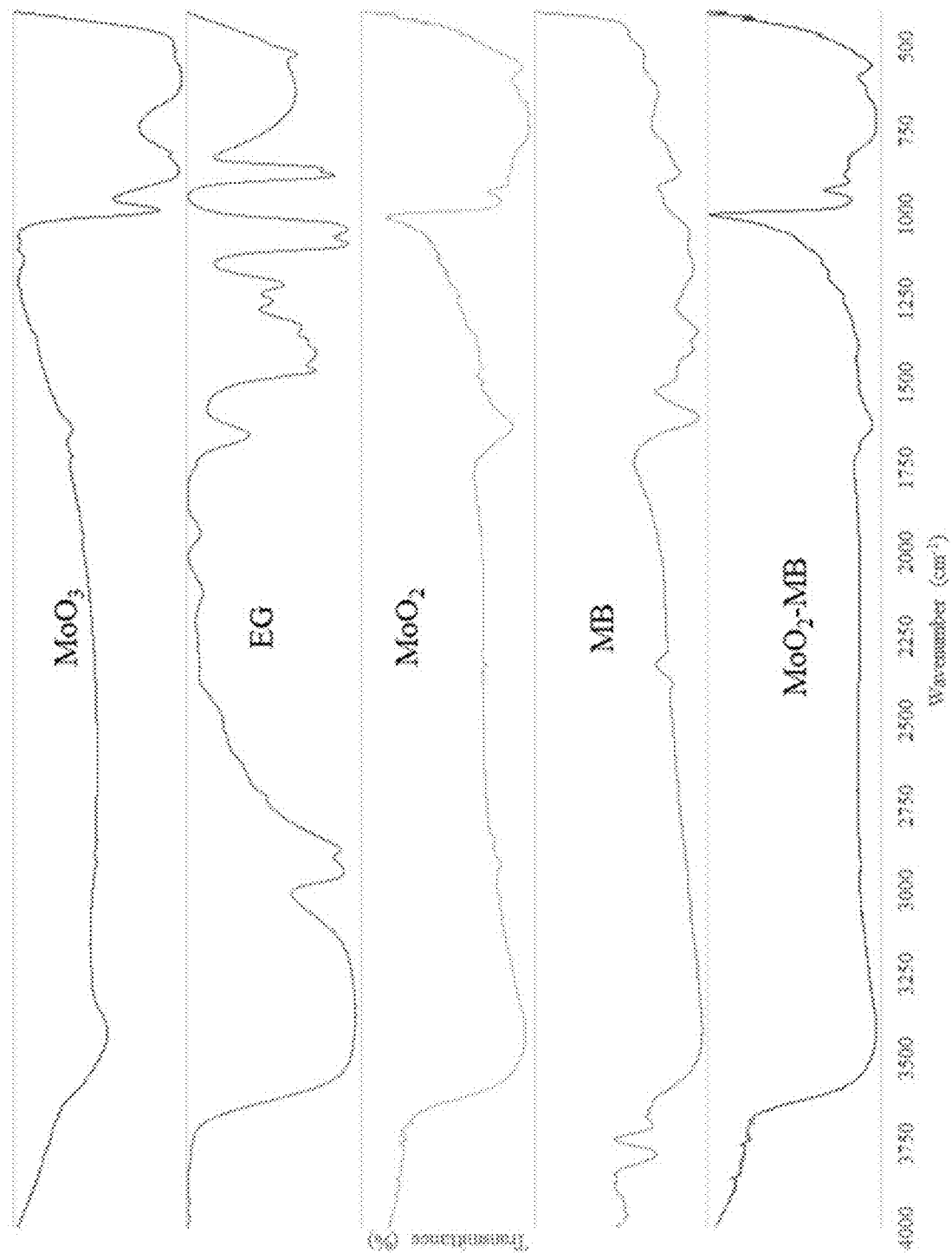
FIG. 11 graphically illustrates FTIR data showing the functionalization of $MoO_2$.

To determine how the MB and $MoO_2$ were bonding with each other, FTIR measurements were taken, as shown in FIG. 11. It was clear that the ethylene glycol had functionalized the $MoO_2$, as indicated by the peaks around 2900, 1600, and 800 $cm^{-1}$.

Figure 12:
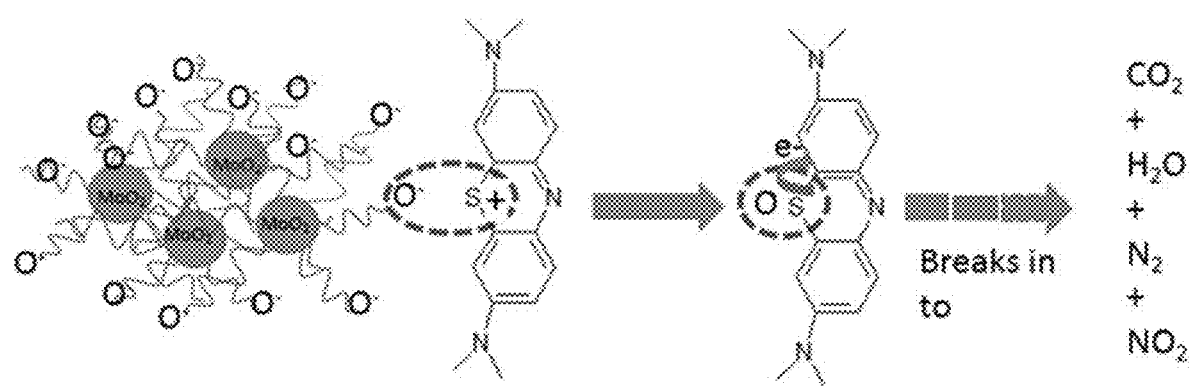
FIG. 12 is a schematic of a possible mechanism for the adsorption and photocatalytic remediation of MB.

FIG. 12 shows a possible mechanism for the adsorption of MB onto the $MoO_2$ due to the functionalization from ethylene glycol, where oxygen from the $MoO_2$ and sulfur from the MB may be attracted due to having the opposite charge. In the presence of visible light, the oxygen may transfer an electron to the sulfur, generating an electron hole pair. This electron hole pair may be able to react with available oxidants and reductants to form radicals, which may cause the MB to be broken down into $CO_2$, $H_2O$, and other byproducts.

Table 4 shows a comparison of the results obtained in this report versus the previously reported data for the decontamination of water using $MoO_2$. The results from the $MoO_2$ nanoparticles described herein were significantly better than previous reports.

TABLE 4

Comparison of decontamination results with previously published data.

| Sample | Sample Weight | Pollutant (volume) | Pollutant Concentration | Source of irradiation | Decontamination | Time | Ref.* |
|---|---|---|---|---|---|---|---|
| $MoO_2$ | 500 mg | Methylene Blue (50 mL) | 10 mg $L^{-1}$ | UV light | 30% | 140 min | A |
| $MoO_2$ | 500 mg | Rhodamine B (50 mL) | 10 mg $L^{-1}$ | UV light | 70% | 140 min | A |
| $MoO_2$ | 25 mg | Rhodamine B (50 mL) | 10 mg $L^{-1}$ | UV and visible light | 15.8% | 90 min | B |
| $MoO_2$ | 5 mg | Methylene Blue (50 mL) | 10 mg $L^{-1}$ | No light exposure | 100% | 2 min | — |
| $MoO_2$ | 5 mg | Methylene Blue (50 mL) | 10 mg $L^{-1}$ | Visible light | 100% | 1 min | — |
| $MoO_2$ | 5 mg | Methylene Blue (50 mL) | 10 mg $L^{-1}$ | UV light | 100% | 2 min | — |
| AM-$MoO_2$ | 5 mg | Methylene Blue (50 mL) | 10 mg $L^{-1}$ | No light exposure | 100% | 2 min | — |
| AM-$MoO_2$ | 5 mg | Methylene Blue (50 mL) | 10 mg $L^{-1}$ | Visible light | 100% | 1 min | — |
| AM-$MoO_2$ | 5 mg | Methylene Blue (50 mL) | 10 mg $L^{-1}$ | UV light | 100% | 1 min | — |

*Reference provided for the data not described herein.
A: Zhou et al., Ceramics International, 2016. 42(2): p. 2198-2203.
B: Hu et al., Chinese J. Inorg. Chem., 2014. 30.

$MoO_2$ nanoparticles were hydrothermally synthesized using $MoO_3$ or nanostructured AM-$MoO_3$ as the molybdenum precursor. SEM and TEM were used to determine the size and morphology of the particles, while XRD was used to confirm composition and crystallinity of the samples. During the decontamination experiments, it became obvious that the synthesized $MoO_2$ and AM-$MoO_2$ samples appear to have both adsorbent properties and photocatalytic properties; something that has not been previously reported. In every single experiment conducted, the same sample always decontaminated the MB faster when exposed to light. Even with only 5 mg of sample in 50 mL of MB (10 mg $L^{-1}$), both materials were able to adsorb 100% of the MB within 2 minutes when not exposed to light, and in only one minute when the samples were exposed to visible light. The best results were able to remove 100% of the MB using up to 100 times less sample (500 mg vs. 5 mg), and up to 140 times less time (140 min vs. 1 min) than previously reported.

The $MoO_2$ nanoparticles synthesized perform orders of magnitude better than previously reported for $MoO_2$ nanoparticles used as a photocatalyst to decontaminate water. To determine the ability of the samples to decontaminate organic pollutants from water, experiments were conducted to measure the degradation of MB. Until now, all previous reports of $MoO_2$ and $MoO_3$ for the decontamination of water have been photocatalytic, requiring the sample be exposed to ultraviolet (UV) or visible light radiation.

When a similar experiment was attempted with the hydrothermally synthesized $MoO_2$ and AM-$MoO_2$ detailed herein, the MB had been completely decontaminated by the end of the 30 minute adsorption/desorption equilibrium. At that point, it became clear that the $MoO_2$ and AM-$MoO_2$ materials were highly adsorbent; so the experiment was modified to see how quickly the samples could adsorb the MB, and if the exposure of visible light affected the rate at which the MB was decontaminated.

The synthesized $MoO_2$ nanoparticles do not only show the photocatalytic effect, but are also strong adsorbents. Even with only 5 mg of sample in 50 mL of MB (10 mg $L^{-1}$), both materials were able to adsorb 100% of the MB within 2 minutes when not exposed to light, and in only one minute when the samples were exposed to visible light. This is the first reported case of a single material having both adsorbent and photocatalytic properties.

For reasons of completeness, various aspects of the invention are set out in the following numbered clauses:

Clause 1. A decontaminant comprising: at least one functionalized $MoO_2$ nanoparticle.

Clause 2. The decontaminant of clause 1, wherein the $MoO_2$ nanoparticle is functionalized with an oxygen-containing ligand.

Clause 3. The decontaminant of clause 1 or 2, wherein the $MoO_2$ nanoparticle is functionalized with ethylene glycol.

Clause 4. The decontaminant of any one of clauses 1-3, wherein the $MoO_2$ nanoparticle has a diameter less than or equal to about 50 nm.

Clause 5. The decontaminant of any one of clauses 1-4, wherein the $MoO_2$ nanoparticle has a diameter between about 30 nm and about 50 nm.

Clause 6. The decontaminant of any one of clauses 1-5, wherein the $MoO_2$ nanoparticle comprises monoclinic $MoO_2$.

Clause 7. The decontaminant of any one of clauses 1-6, wherein the decontaminant does not comprise $MoO_3$.

Clause 8. The decontaminant of any one of clauses 1-7, wherein the $MoO_2$ nanoparticle simultaneously exhibits adsorbent and photocatalytic properties.

Clause 9. The decontaminant of any one of clauses 1-8, wherein 5 mg of the decontaminant is capable of removing at least 99.5% of methylene blue (MB) from 50 mL of a 10 mg/L MB aqueous solution in less than 1 minute in the absence of visible light and UV light.

Clause 10. The decontaminant of any one of clauses 1-8, wherein 5 mg of the decontaminant is capable of removing 100% of methylene blue (MB) from 50 mL of a 10 mg/L MB aqueous solution in less than 1 minute in the presence of visible light having an intensity of about 800 W/$m^2$.

Clause 11. A method of decontamination comprising: applying the decontaminant of clause 1 to a fluid contaminated with a pollutant; and chemically reacting the decontaminant with the pollutant to at least partially remove the pollutant from the fluid.

Clause 12. The method of clause 11, wherein the fluid is water or an aqueous solution.

Clause 13. The method of clause 11 or 12, wherein the pollutant is a dye, an organic molecule, a chemical warfare agent or combinations thereof.

Clause 14. The method of any one of clauses 11-13, wherein the pollutant is a dye.

Clause 15. The method of any one of clauses 11-14, wherein the pollutant is methylene blue (MB).

Clause 16. The method of any one of clauses 11-15, further comprising applying visible or UV light.

Clause 17. The method of clause 16, wherein the visible or UV light is applied with an intensity equal to or greater than about 800 $W/m^2$.

Clause 18. The method of any one of clauses 11-15, wherein the method does not comprise providing or applying visible or UV light.

Clause 19. The method of any one of clauses 11-18, wherein when the concentration of pollutant in the fluid is about 10 mg/L, applying 5 mg of the decontaminant removes at least 99.5% of the pollutant from the fluid in less than 1 minute in the absence of visible light and UV light.

Clause 20. The method of any one of clauses 11-18, wherein when the concentration of pollutant in the fluid is about 10 mg/L, applying 5 mg of the decontaminant removes 100% of the pollutant from the fluid in less than 1 minute when visible light having an intensity of about 800 $W/m^2$ is present.

Clause 21. The method of any one of clauses 11-20, wherein the pollutant is broken down into $CO_2$, $H_2O$, and/or other chemical byproducts.

Clause 22. The method of any one of clauses 11-21, wherein the $MoO_2$ nanoparticle forms an electron-hole pair with the pollutant and/or wherein chemically reacting the decontaminant with the pollutant produces radical intermediates.

Clause 23. A method of producing the decontaminant one of clauses 1-10, comprising: mixing $MoO_3$ with a reducing agent in water to form a mixture; heating the mixture; and forming the decontaminant.

Clause 24. The method of clause 23, wherein the $MoO_3$ is produced by heating ammonium molybdate at about 350° C.

Clause 25. The method of clause 23 or 24, wherein the reducing agent is ethylene glycol.

Clause 26. The method of any one of clauses 23-25, wherein the mixture is heated under a pressure greater than about 1 atm.

Clause 27. The method of any one of clauses 23-26, wherein the mixture is heated at about 180° C.

Clause 28. The method of clause 27, wherein the mixture is heated for less than or equal to about 12 hours.

Clause 29. The method of any one of clauses 23-28, further comprising applying centrifugation to the mixture after the heating step.

Clause 30. The method of any one of clauses 23-29, further comprising cleaning the mixture with ethanol and/or water after the heating step.

Clause 31. The method of any one of clauses 23-30, further comprising drying the mixture after the heating step.

Clause 32. The method of any one of clauses 23-31, wherein the decontaminant does not comprise a measureable amount of $MoO_3$.

Various features and advantages of the invention are set forth in the following claims.

What is claimed is:

1. A method of decontamination of a fluid comprising:
   applying a decontaminant to the fluid contaminated with a pollutant wherein the decontaminant consists essentially of
   at least one functionalized $MoO_2$ nanoparticle wherein the decontaminant is formed by a process consisting essentially of mixing $MoO_3$ with deionized water and ethylene glycol having structure

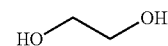

in water to form a mixture; and
   heating the mixture at about 180° C. under a pressure greater than about 1 atm for less than or equal to about 12 hours to form at least one functionalized $MoO_2$ nanoparticle;
   centrifuging the mixture to separate a powder;
   cleaning the powder with ethanol, water, or a combination thereof; and
   drying the powder; and
   chemically reacting the decontaminant with the pollutant to at least partially remove the pollutant from the fluid;
   wherein at least 99% of the pollutant is removed from the fluid, in the presence or absence of visible or UV light, within 2 minutes.

2. The method of claim 1, wherein the pollutant is a dye, an organic molecule, a chemical warfare agent or combinations thereof.

3. The method of claim 1, further comprising applying the visible or UV light.

4. The method of claim 3, wherein the visible or UV light is applied with an intensity equal to or greater than about 800 $W/m^2$.

5. The method of claim 1, wherein the pollutant is removed from the fluid in the absence of the visible or UV light.

6. The method of claim 1, wherein the pollutant is broken down into $CO_2$, $H_2O$, and/or other chemical byproducts.

* * * * *